US012764278B2

(12) United States Patent
Xie

(10) Patent No.: US 12,764,278 B2
(45) Date of Patent: Oct. 13, 2026

(54) INTRA PREDICTION METHOD AND DECODER

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 13 days.

(21) Appl. No.: 18/753,852

(22) Filed: Jun. 25, 2024

(65) Prior Publication Data

US 2024/0348778 A1 Oct. 17, 2024

Related U.S. Application Data

(63) Continuation of application No. PCT/CN2021/142113, filed on Dec. 28, 2021.

(51) Int. Cl.
*H04N 19/11* (2014.01)
*H04N 19/176* (2014.01)

(52) U.S. Cl.
CPC ........... *H04N 19/11* (2014.11); *H04N 19/176* (2014.11)

(58) Field of Classification Search
CPC .... H04N 19/11; H04N 19/176; H04N 19/147; H04N 19/593; H04N 19/70; H04N 19/105
See application file for complete search history.

(56) References Cited

U.S. PATENT DOCUMENTS

2020/0221084 A1 7/2020 Jang et al.
2021/0352273 A1 11/2021 Lim et al.
2022/0394269 A1* 12/2022 Cao ...................... H04N 19/159
2023/0108480 A1* 4/2023 Li ........................ H04N 19/176 375/240.02
2024/0007636 A1* 1/2024 Jeon ....................... H04N 19/70
2024/0244192 A1* 7/2024 Jhu ...................... H04N 19/132

FOREIGN PATENT DOCUMENTS

CN 104737537 6/2015
CN 111434109 7/2020

OTHER PUBLICATIONS

WIPO, International Search Report and Written Opinion for International Application No. PCT/CN2021/142113, Jun. 29, 2022.

(Continued)

*Primary Examiner* — Francis Geroleo
(74) *Attorney, Agent, or Firm* — Hodgson Russ LLP

(57) ABSTRACT

An intra prediction method includes the following. A first intra prediction mode and a second intra prediction mode for a current block are determined. A weighted blending condition for the current block is determined according to an image content of a current sequence, where the weighted blending condition is used to determine whether weighted prediction is performed on the current block based on the first intra prediction mode and the second intra prediction mode. A target prediction value of the current block is determined according to the weighted blending condition and at least one of the first intra prediction mode or the second intra prediction mode.

13 Claims, 11 Drawing Sheets

(56) References Cited

OTHER PUBLICATIONS

Coban et al., "Algorithm description of Enhanced Compression Model 3 (ECM 3)," Joint Video Experts Team (JVET) of ITU-T SG 16 WP 3 and ISO/IEC JTC 1/SC 29, Document: JVET-X2025, Jul. 2021.
Abdoli et al., "Decoder-Side Intra Mode Derivation For Next Generation Video Coding", 2020 IEEE International Conference on Multimedia and Expo (ICME), IEEE, Jul. 2020.
Wang et al., "EE2-related: Template-based intra mode derivation using MPMs," Joint Video Experts Team (JVET) of ITU-T SG 16 WP 3 and ISO/IEC JTC 1/SC 29, Document: JVET-V0098, Apr. 2021.
EPO, Extended European Search Report for EP Application No. 21969347.0, Oct. 6, 2025.

* cited by examiner

INTRA PREDICTION METHOD AND DECODER

CROSS-REFERENCE TO RELATED APPLICATION(S)

This application is a continuation of International Application No. PCT/CN2021/142113, filed Dec. 28, 2021, the entire disclosure of which is incorporated herein by reference.

TECHNICAL FIELD

This disclosure relates to the technical field of video coding, and in particular to an intra prediction method and a decoder.

BACKGROUND

Digital video technology may be incorporated into multiple video apparatuses such as a digital television, a smart mobile phone, a computer, an e-reader, or a video player, etc. With the development of video technology, video data includes an enormous amount of data. To facilitate video data transmission, a video apparatus implements a video compression technology to enable more effective transmission or storage of the video data.

Compression of the video is realized through encoding, where the encoding process includes prediction, transformation, and quantization, etc. For example, a prediction block of a current block is determined by intra prediction and/or inter prediction, the prediction block is subtracted from the current block to obtain a residual block, the residual block is transformed to obtain transform coefficients, and the transform coefficients are quantized to obtain quantization coefficients that are then encoded to form a bitstream.

In order to improve accuracy of intra prediction, weighted blending prediction may be performed on the current block by using two or more intra prediction modes, so as to obtain a prediction value of the current block. However, in some cases, for example, for a recorded screen content, when weighted blending prediction is performed on the current block by using multiple intra prediction modes, prediction quality may be reduced instead.

SUMMARY

In a first aspect, an intra prediction method is provided in the present disclosure. The method includes the following. A bitstream is decoded to determine a first intra prediction mode and a second intra prediction mode for a current block. A weighted blending condition for the current block is determined according to an image content of a current sequence, where the weighted blending condition is used to determine whether weighted prediction is performed on the current block based on the first intra prediction mode and the second intra prediction mode. A target prediction value of the current block is determined according to the weighted blending condition and at least one of the first intra prediction mode or the second intra prediction mode.

In a second aspect, an intra prediction method is provided in embodiments of the present disclosure. The method includes the following. A first intra prediction mode and a second intra prediction mode for a current block are determined. A weighted blending condition for the current block is determined according to an image content of a current sequence, where the weighted blending condition is used to determine whether weighted prediction is performed on the current block based on the first intra prediction mode and the second intra prediction mode. An intermediate prediction value of the current block is determined according to the weighted blending condition and at least one of the first intra prediction mode or the second intra prediction mode. A target prediction value of the current block is determined according to the intermediate prediction value.

In a third aspect, a video decoder is provided. The video decoder includes a processor and a memory for storing a computer program. The processor is configured to invoke and run the computer program stored in the memory to perform the method of the first aspect or implementations thereof.

DETAILED DESCRIPTION

The disclosure can be applied to the fields of picture coding, video coding, hardware video coding, dedicated circuit video coding, real-time video coding, etc. For example, the solution in the disclosure may be incorporated into audio video coding standards (AVS), such as H.264/audio video coding (AVC) standard, H.265/high efficiency video coding (HEVC) standard, and H.266/versatile video coding (VVC) standard. Alternatively, the solution in the disclosure may incorporated into other proprietary or industry standards, including ITU-TH.261, ISO/IECMPEG-1 Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It may be understood that the techniques in the disclosure are not limited to any particular coding standard or technology.

Figure 1:
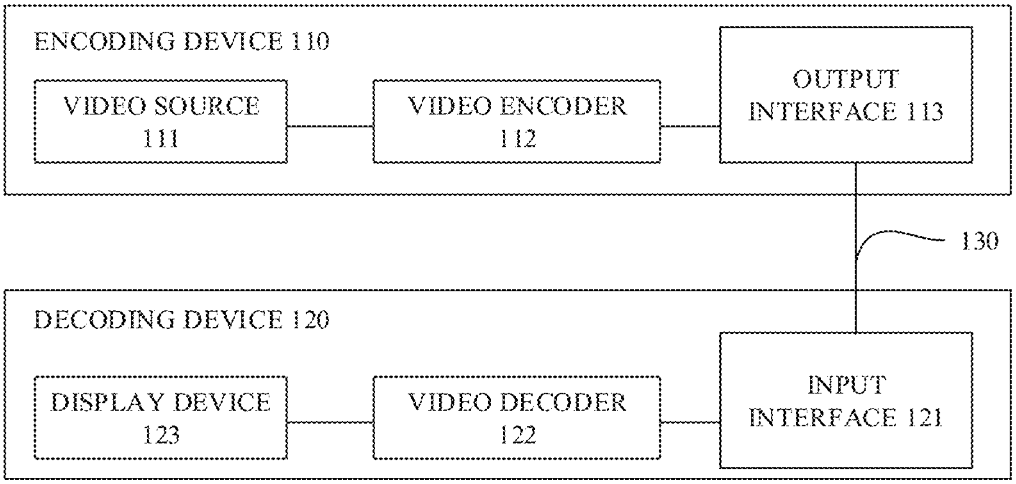
FIG. 1 is a schematic block diagram of a video coding system in embodiments of the present disclosure.

For ease of understanding, a video coding system in embodiments of the present disclosure is first introduced with reference to FIG. 1.

FIG. 1 is a schematic block diagram of a video coding system in embodiments of the present disclosure. It may be noted that FIG. 1 is only an example, and the video coding system in embodiments of the present disclosure includes but is not limited to what is illustrated in FIG. 1. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain decoded video data.

The encoding device 110 in the embodiments of the present disclosure can be understood as a device having a video encoding function, and the decoding device 120 can be understood as a device having a video decoding function, that is, the encoding device 110 and the decoding device 120 in the embodiments of the present disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding device 110 may transmit encoded video data (such as bitstream) to the decoding device 120 via a channel 130. The channel 130 may include one or more media and/or apparatuses capable of transmitting the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, DVDs, flash memory, and the like. In this example, the decoding device 120 may obtain encoded video data from the storage medium.

In another example, the channel 130 may include a storage server that may store video data encoded by the encoding device 110. In this example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some embodiments, the encoding device 110 includes a video encoder 112 and an output interface 113. The output interface 113 may include a modulator/demodulator (modem) and/or a transmitter.

In some embodiments, the encoding device 110 may include a video source 111 in addition to the video encoder 112 and the output interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding device 120 via the output interface 113. The encoded video data may also be stored on a storage medium or a storage server for subsequent reading by the decoding device 120.

In some embodiments, the decoding device 120 includes an input interface 121 and a video decoder 122.

In some embodiments, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the present disclosure are not limited to FIG. 1. For example, the technology of the present disclosure may also be applied to one-sided video encoding or one-sided video decoding.

A video encoding framework in embodiments of the present disclosure will be introduced below.

Figure 2:
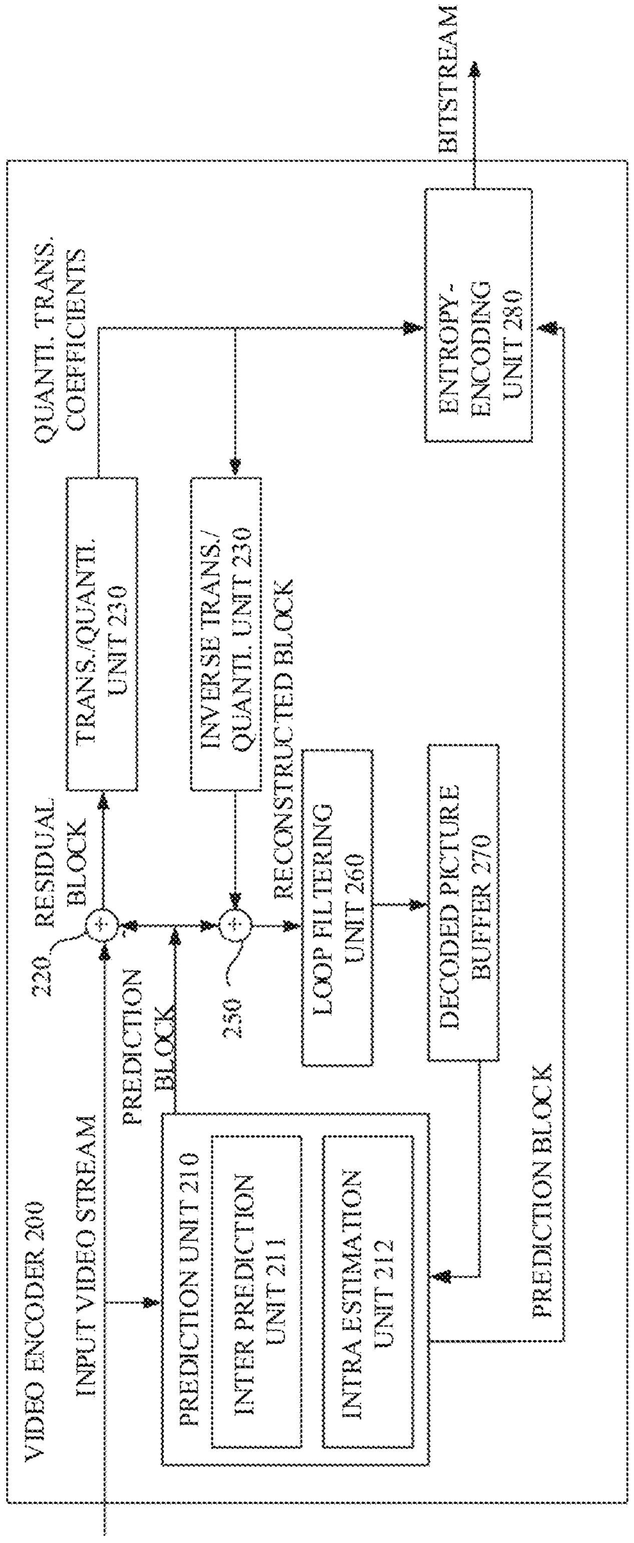
FIG. 2 is a schematic block diagram of a video encoder in embodiments of the present disclosure.

FIG. 2 is a schematic block diagram of a video encoder in embodiments of the present disclosure. It may be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y represents luminance (Luma), Cb (U) represents blue chrominance, and Cr (V) represents red chrominance. U and VI represent chrominance (Chroma) for describing colour and saturation. For example, in terms of colour format, 4:2:0 represents that every 4 pixels have 4 luma components and 2 chroma components (YYYYCbCr), 4:2:2 represents that every 4 pixels have 4 luma components and 4 chroma components (YYYYCbCrCbCr), and 4:4:4 represents full pixel display (YYYYCbCrCbCrCbCrCbCr).

For example, the video encoder 200 reads video data, and for each picture in the video data, divides the picture into several coding tree units (CTU). In some examples, the CTU may be called "tree block", "largest coding unit" (LCU), or "coding tree block" (CTB). Each CTU may be associated with a sample block of the same size as the CTU within the picture. Each sample may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further divided into several coding units (CUs) for coding. The CU may be a rectangular block or a square block. The CU may be further divided into a prediction unit (PU) and a transform unit (TU), so that coding, prediction, and transformation are separated, and thus processing is more flexible. In an example, the CTU is divided into CUs in a quadtree manner, and the CU is divided into TUs and PUs in a quadtree manner.

The video encoder and the video decoder can support various PU sizes. Assuming that a size of a specific CU is 2N×2N, video encoders and video decoders may support PUs of 2N×2N or N×N for intra prediction, and support symmetric PUs of 2N×2N, 2N×N, N×2N, N×N, or similar size for inter prediction. The video encoder and video decoder may also support asymmetric PUs of 2N×nU, 2N×nD, nL×2N, or nR×2N for inter prediction.

In some embodiments, as illustrated in FIG. 2, the video encoder 200 may include a prediction unit 210, a residual unit 220, a transform/quantization unit 230, an inverse transform/quantization unit 240, a reconstruction unit 250, a loop filtering unit 260, a decoded picture buffer 270, and an entropy-encoding unit 280. It may be noted that the video encoder 200 may include more, less, or different functional components.

Optionally, in this disclosure, a current block may be referred to as a current CU or a current PU. A prediction block may be referred to as a predicted picture block or a picture prediction block, and a reconstructed picture block may be referred to as a reconstructed block or a picture reconstructed block.

In some embodiments, the prediction unit 210 includes an inter prediction unit 211 and an intra estimation unit 212. Since there is a strong correlation between adjacent samples in a video picture, intra prediction is used in the video coding technology to eliminate spatial redundancy between adjacent samples. Since there is a strong similarity between adjacent pictures in video, inter prediction is used in the video coding technology to eliminate temporal redundancy between adjacent pictures, thereby improving encoding efficiency.

The inter prediction unit 211 may be used for inter prediction. The inter prediction can refer to picture information of different pictures. In inter prediction, motion information is used to find a reference block from a reference picture, and a prediction block is generated according to the reference block to eliminate temporal redundancy. A picture for which inter prediction is used may be a P frame and/or a B frame, where P frame refers to a forward predicted picture, and B frame refers to a bidirectional predicted picture. The motion information includes a reference picture list containing the reference picture, a reference picture index, and a motion vector. The motion vector can be a full-pixel motion vector or a sub-pixel motion vector. If the motion vector is the sub-pixel motion vector, interpolation filtering on the reference picture is required to generate a required sub-pixel block. Here, a block of full-pixels or sub-pixels found in the reference picture according to the motion vector is called a reference block. In some technologies, the reference block may be called a prediction block, and in some technologies the prediction block will be generated based on the reference block. Generating the prediction block based on the reference block may also be understood as taking the reference block as a prediction block and then processing and generating a new prediction block based on the prediction block.

The intra estimation unit 212 predicts sample information of the current picture block by only referring to information of the same picture, so as to eliminate spatial redundancy. A frame for which intra prediction is used may be an I frame. For example, for a 4×4 current block, samples in the left column and the top row of the current block are used as reference samples for intra prediction of the current block. These reference samples may all be available, i.e., they have all been coded. Alternatively, some of these reference samples may not be available. For example, if the current block is on the leftmost of the picture, reference samples on the left of the current block are not available. For another example, during coding the current block, if samples on the bottom left of the current block have not yet been coded, the reference samples on the bottom left are also not available. The reference samples that are not available may be filled with available reference samples or certain values, or by using certain methods, or no filling may be performed.

Figure 4:
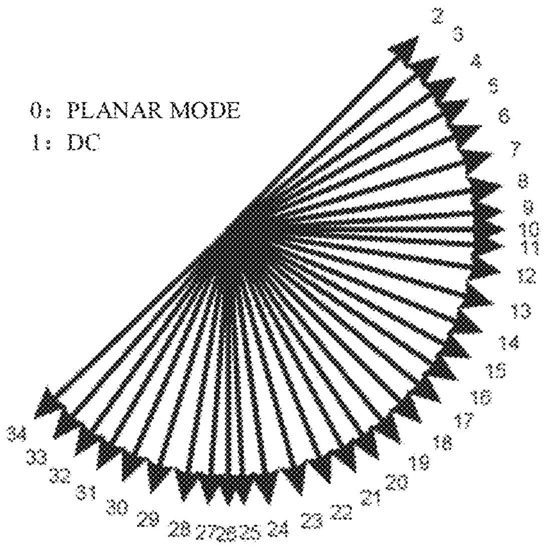
FIG. 4 is a schematic diagram of intra prediction modes.
Figure 5:
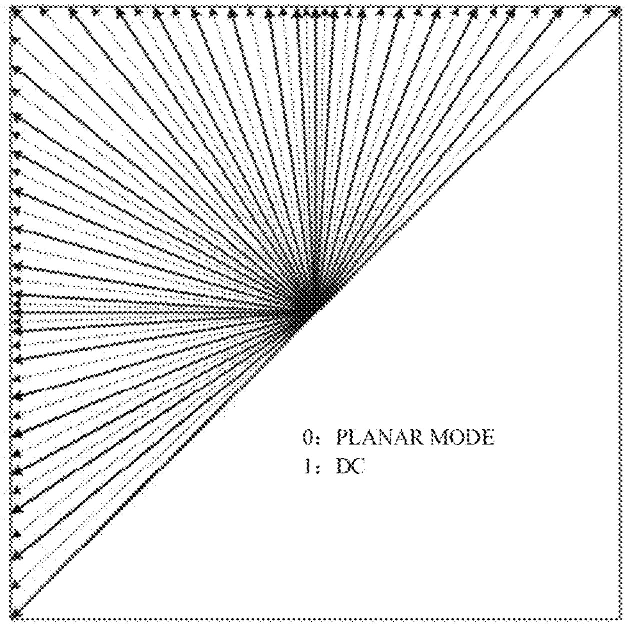
FIG. 5 is a schematic diagram of intra prediction modes.
Figure 6:
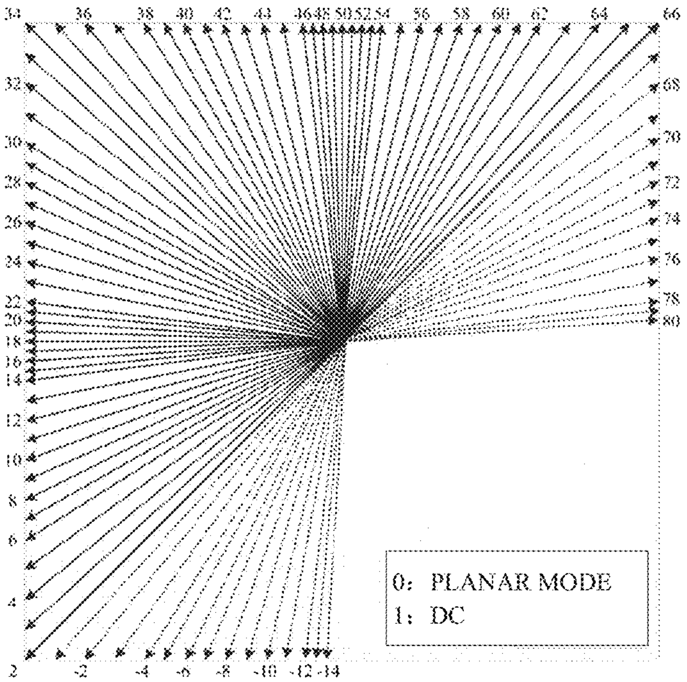
FIG. 6 is a schematic diagram of intra prediction modes.

There are multiple prediction modes for intra prediction. For example, FIG. 4 is a schematic diagram of intra prediction modes. As illustrated in FIG. 4, intra prediction modes used in HEVC include a Planar mode, a DC mode, and 33 angular modes, with a total of 35 prediction modes. FIG. 5 is a schematic diagram of intra prediction modes. As illustrated in FIG. 5, intra modes used in VVC include a Planar mode, a DC mode, and 65 angular modes, with a total of 67 prediction modes. FIG. 6 is a schematic diagram of intra prediction modes. As illustrated in FIG. 6, AVS3 uses a total of 66 prediction modes, including a DC mode, a Planar mode, a Bilinear mode, and 63 angular modes.

It may be noted that with the increase in the number of angular modes, the intra prediction will be more accurate, which will be more in line with the demand for the development of high-definition and ultra-high-definition digital video.

The residual unit 220 may generate a residual block of the CU based on a sample block of the CU and a prediction block of a PU of the CU. For example, the residual unit 220 may generate the residual block for the CU such that each sample in the residual block has a value equal to a difference between a sample in the sample block of the CU and a corresponding sample in the prediction block of the PU of the CU.

The transform/quantization unit 230 may quantize transform coefficients. The transform/quantization unit 230 may quantize transform coefficients associated with a TU of a CU based on a quantization parameter (QP) value associated with the CU. The video encoder 200 may adjust the degree of quantization applied to transform coefficients associated with the CU by adjusting the QP value associated with the CU.

The inverse transform/quantization unit 240 may perform inverse quantization and inverse transform respectively on the quantized transform coefficients to reconstruct a residual block from the quantized transform coefficients.

The reconstruction unit 250 may add samples in the reconstructed residual block with corresponding samples in one or more prediction blocks generated by the prediction unit 210 to generate a reconstructed picture block associated with the TU. By reconstructing sample blocks of each TU of the CU in this way, the video encoder 200 can reconstruct the sample block of the CU.

The loop filtering unit 260 may perform deblocking filtering to reduce blocking artifacts of the sample block associated with the CU.

In some embodiments, the loop filtering unit 260 includes a deblocking filtering unit and a sample adaptive offset/adaptive loop filtering (SAO/ALF) unit, where the deblocking filtering unit is configured for deblocking, and the SAO/ALF unit is configured to remove a ringing effect.

The decoded picture buffer 270 may buffer reconstructed sample blocks. The inter prediction unit 211 may use reference pictures containing reconstructed sample blocks to perform inter prediction on PUs of other pictures. In addition, the intra estimation unit 212 may use the reconstructed sample blocks in the decoded picture buffer 270 to perform intra prediction on other PUs in the same picture as the CU.

The entropy-encoding unit 280 may receive the quantized transform coefficients from the transform/quantization unit 230. The entropy-encoding unit 280 may perform one or more entropy-encoding operations on the quantized transform coefficients to generate entropy-encoded data.

Figure 3:
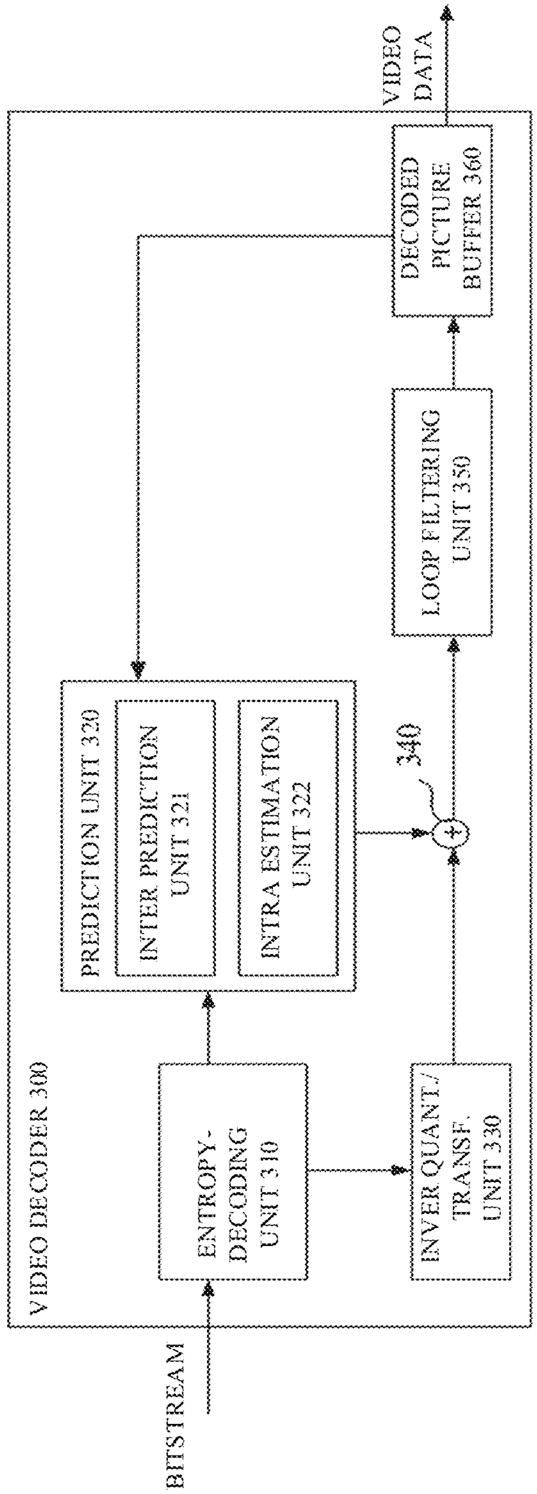
FIG. 3 is a schematic block diagram of a video decoder in embodiments of the present disclosure.

FIG. 3 is a schematic block diagram of a video decoder in embodiments of the present disclosure.

As illustrated in FIG. 3, the video decoder 300 includes an entropy-decoding unit 310, a prediction unit 320, an inverse quantization/transform unit 330, a reconstruction unit 340, a loop filtering unit 350, and a decoded picture buffer 360. It may be noted that the video decoder 300 may include more, less, or different functional components.

The video decoder 300 may receive a bitstream. The entropy-decoding unit 310 may parse the bitstream to extract syntax elements from the bitstream. As part of parsing the bitstream, the entropy-decoding unit 310 may parse entropy-encoded syntax elements in the bitstream. The prediction unit 320, the inverse quantization/transform unit 330, the reconstruction unit 340, and the loop filtering unit 350 may decode video data according to the syntax elements extracted from the bitstream, that is, generate decoded video data.

In some embodiments, the prediction unit 320 includes an inter prediction unit 321 and an intra estimation unit 322.

The intra estimation unit 322 (also referred to as the "intra prediction unit") may perform intra prediction to generate a prediction block of a PU. The intra estimation unit 322 may use an intra prediction mode to generate a prediction block of the PU based on a sample block of spatially neighbouring PUs. The intra estimation unit 322 may also determine an intra prediction mode for the PU according to one or more syntax elements parsed from the bitstream.

The inter prediction unit 321 can construct a first reference picture list (list 0) and a second reference picture list (list 1) according to the syntax elements parsed from the bitstream. Furthermore, the entropy-decoding unit 310 may parse motion information of the PU if the PU is encoded using inter prediction. The inter prediction unit 321 may determine one or more reference blocks for the PU according to the motion information of the PU. The inter prediction unit 321 may generate a prediction block for the PU based on one or more reference blocks of the PU.

The inverse quantization/transform unit 330 (also referred to as the "de-quantization/transform unit") may perform inverse quantization on (i.e., dequantize) transform coefficients associated with a TU. The inverse quantization/transform unit 330 may use a QP value associated with a CU of the TU to determine the degree of quantization.

After inverse quantization of the transform coefficients, the inverse quantization/transform unit 330 may perform one or more inverse transformations on the inverse-quantized transform coefficients in order to generate a residual block associated with the TU.

The reconstruction unit 340 uses the residual blocks associated with the TU of the CU and the prediction block of the PU of the CU to reconstruct a sample block of the CU. For example, the reconstruction unit 340 may add samples in the residual block with corresponding samples in the prediction block to reconstruct the sample block of the CU to obtain the reconstructed picture block.

The loop filtering unit 350 may perform deblocking filtering to reduce blocking artifacts of the sample block associated with the CU.

The video decoder 300 may store the reconstructed picture of the CU in the decoded picture buffer 360. The video decoder 300 may use the reconstructed picture in the decoded picture buffer 360 as a reference picture for subsequent prediction, or transmit the reconstructed picture to a display device for display.

As can be seen from FIG. 2 and FIG. 3, a basic process of video coding is as follows. At the encoding end, a picture (or frame) is divided into blocks, and for a current block, the prediction unit 210 performs intra prediction or inter prediction to generate a prediction block of the current block. The residual unit 220 may calculate a residual block based on the prediction block and the original block of the current block. For example, the prediction block is subtracted from the original block of the current block to obtain the residual block, where the residual block may also be referred to as residual information. The residual block can be transformed and quantized by the transform/quantization unit 230 to remove information that is not sensitive to human eyes, so as to eliminate visual redundancy. Optionally, the residual block before being transformed and quantized by the transform/quantization unit 230 may be called a time-domain residual block, and the time domain residual block after being transformed and quantized by the transform/quantization unit 230 may be called a frequency residual block or a frequency-domain residual block. The entropy-encoding unit 280 receives the quantized transformation coefficients output by the transform/quantization unit 230, and may perform entropy-encoding on the quantized transformation coefficients to output a bitstream. For example, the entropy-encoding unit 280 can eliminate character redundancy according to the target context model and probability information of the binary bitstream.

At the decoding end, the entropy-decoding unit 310 may parse the bitstream to obtain prediction information, a quantization coefficient matrix, etc. of the current block, and the prediction unit 320 performs intra prediction or inter prediction on the current block based on the prediction information to generate a prediction block of the current block. The inverse quantization/transform unit 330 uses the quantization coefficient matrix obtained from the bitstream to perform inverse quantization and inverse transformation on the quantization coefficient matrix to obtain a residual block. The reconstruction unit 340 adds the prediction block and the residual block to obtain a reconstructed block. The reconstructed blocks form a reconstructed picture. The loop filtering unit 350 performs loop filtering on the reconstructed picture on a picture basis or on a block basis to obtain a decoded picture. Similar operations for obtaining the decoded picture at the decoding end are also needed at the encoding end. The decoded picture may also be referred to as a reconstructed picture, and the reconstructed picture may be a reference picture of a subsequent picture for inter prediction.

It may be noted that block division information determined at the encoding end, as well as mode information or parameter information for prediction, transformation, quantization, entropy-encoding, and loop filtering, etc., are carried in the bitstream when necessary. The decoding end parses the bitstream and analyzes existing information to determine the block division information, as well as mode information or parameter information for prediction, transformation, quantization, entropy-encoding, loop filtering, etc. the same as such information at the encoding end, so as to ensure the decoded picture obtained by the encoding end is the same as the decoded picture obtained by the decoding end.

The current block may be the current CU or the current PU, etc.

The above is the basic process of the video encoder and the video decoder under a block-based hybrid coding framework. With the development of technology, some modules or steps of the framework or process may be optimized. This disclosure is applicable to the basic process of the video encoder and the video decoder under the block-based hybrid coding framework, but is not limited to the framework and process.

As can be seen from the above, during coding, in a general hybrid coding framework, prediction is first performed, which utilizes spatial or temporal correlation to obtain a picture that is the same or similar to the current block. It is possible for a block that the prediction block is identical to the current block, but it is difficult to guarantee that this is the case for all blocks in a video, especially in a natural video or a video captured by a camera, due to the presence of noise. In addition, it is hard to completely predict irregular movements, distortions, deformations, occlusions, variations in brightness, etc. in a video. Therefore, the hybrid coding framework subtracts the predicted picture from the original picture of the current block to obtain the residual picture, or in other words, subtracts the prediction block from the current block to obtain the residual block. The residual block is usually much simpler than the original picture, and thus prediction can significantly improve compression efficiency. The residual block is usually transformed first, rather than being encoded directly. During the transformation, the residual picture is transformed from the spatial domain to the frequency domain, to remove the correlation from the residual picture. After the residual picture is transformed to the frequency domain, the transformed non-zero coefficients are mostly concentrated in the upper-left corner since the energy is mostly concentrated in the low-frequency region. Next, quantization is utilized for further compression. Since the human eye is not sensitive to high frequencies, a larger quantization step may be used for the high-frequency region.

JVET, the international video coding standard development organization, has set up a group to research beyond the H.266/VVC coding model and named the model, i.e., the platform test software, as Enhanced Compression Model (ECM). ECM has started to adopt newer and more efficient compression algorithms based on VTM10.0, and has surpassed VVC in terms of coding performance by about 13% at present. ECM not only expands the size of the coding unit for a given resolution, but also integrates many intra prediction and inter prediction technologies. The present disclosure mainly relates to intra prediction technologies.

ECM is a reference software for tools as well as tool combinations to further improve the performance of VVC. ECM is based on VTM-10.0 and integrates EE-adopted tools and technologies.

In the intra coding of ECM, similar to VTM (a reference software test platform for VVC), there are traditional processes such as intra prediction and transformation of residuals. Different from VVC, two technologies are adopted to derive an intra prediction mode in the intra prediction process, namely Decoder-side Intra Mode Derivation (DIMD) and Template-based Intra Mode Derivation (TIMD).

The DIMD and TIMD technologies allow the derivation of intra prediction modes at the decoding side, thus avoiding encoding of indexes of the intra prediction modes, so as to achieve codeword savings.

The TIMD uses a manner of deriving prediction modes through the same operations at both the encoding end and the decoding end to save overhead of mode-index transmission, and further uses a blending method to improve quality of a prediction block in intra prediction. The TIMD technology in ECM 2.0 can be understood as two main parts. First, cost information of original intra prediction angular modes and non-angular modes is calculated according to a template, and a prediction mode corresponding to a lowest cost and a prediction mode corresponding to a second lowest cost will be selected, where the prediction mode corresponding to the lowest cost is referred to as mode 1 (denoted as mode1) and the prediction mode corresponding to the second lowest cost is referred to as mode 2 (denoted as mode2). An original intra prediction angular mode is designed in the existing ECM to be obtained from a most probable mode (MPM) list, thereby reducing complexity. The original intra prediction angular modes have 65 angular modes and 2 non-angular modes in total. Traversing all the 67 prediction modes will cause considerable costs and burdens at both the encoding end and the decoding end, while traversing prediction modes in the MPM list is an optimized solution that trades off performance against complexity.

Figure 7:
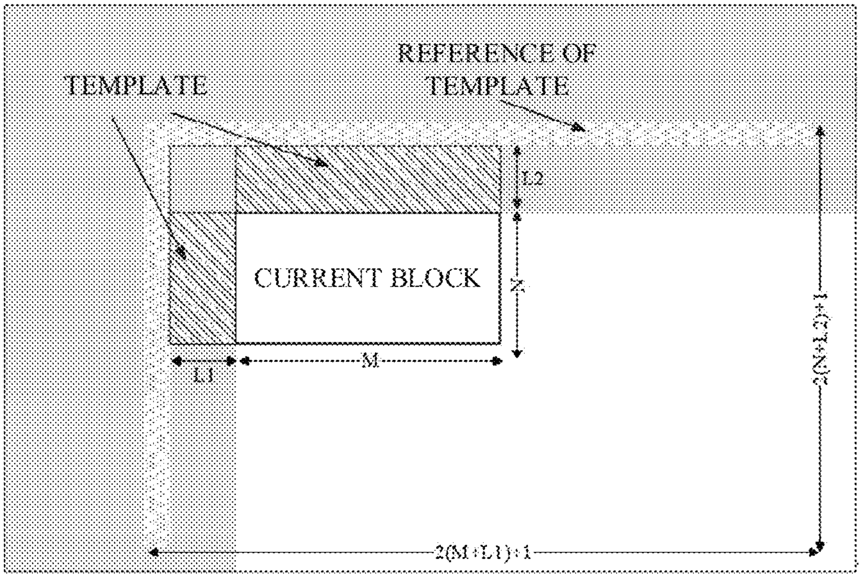
FIG. 7 is a schematic diagram illustrating prediction under template-based intra mode derivation (TIMD).

As illustrated in FIG. 7, in TIMD, an MPM list is derived from intra prediction modes selected for five blocks, namely a top block, a left block, a top-left block, a bottom-left block, and a top-right block of a current block. As illustrated in FIG. 7, taking reconstructed values of a reference of the template as reference rows, prediction results of the template region can be obtained respectively. A sum of absolute transformed differences (SATD) between the reconstructed value of the template and the prediction result under each mode is calculated separately, and two modes with a smallest SATD and a second smallest SATD will be used as prediction modes for the current block for prediction and weighting.

If the MPM list includes at least two prediction modes and does not include any angular prediction mode, then a blending operation may not be performed in TIMD, and only a prediction block obtained in mode1 is used as a prediction block of a current CU.

Otherwise, in TIMD blending, the prediction mode may be further refined. If mode1 is an angular mode, taking mode1 as a central prediction direction, mode1 is offset to the left by a certain angle to obtain $mode1^{+}$ and is offset to the right by a certain angle to obtain $mode1^{-}$. If cost information of $mode1^{+}$ or $mode1^{-}$ is less than that of mode1, $mode1^{+}$ or $mode1^{-}$ replaces mode1 as the updated optimal prediction mode. Similarly, mode2 may be refined.

If a ratio of the second-lowest-cost value costMode2 to the lowest-cost value costMode1 satisfies a weighted blending condition, for example, costMode2<2*costMode1, then weighted blending is performed on prediction blocks corresponding to mode1 and mode2 according to preset weights. The preset weights are calculated according to the cost information.

For example, a weight corresponding to mode1 is determined according to the following formula (1), and a weight corresponding to mode2 is determined according to the following formula (2):

$$weight1 = costMode2/(costMode1 + costMode2) \tag{1}$$

$$weight2 = 1 - weight1 \tag{2}$$

After the weights corresponding to mode1 and mode2 are determined according to the above formulas, a prediction value of the current block may be determined according to the following formula (3).

$$Pred = Pred_{mode1} \times w1 + Pred_{mode2} \times w2 \tag{3}$$

In the above, weight1 is a weight of a prediction value corresponding to mode1, weight2 is a weight of a prediction value corresponding to mode2, $Pred_{mode1}$ is a prediction value corresponding to mode1, $Pred_{mode2}$ is the prediction value corresponding to mode2, and Pred is a prediction value under TIMD.

If the ratio of the second-lowest-cost value costMode2 to the lowest-cost value costMode1 does not satisfy the weighted blending condition, weighted blending will not be performed on the prediction values, and the prediction value corresponding to mode1 is used as the prediction value under TIMD.

If five reference reconstruction samples in the top, left, top-left, bottom-left, and top-right of the current block are all not available, the TIMD technology selects the Planar mode for prediction and does not perform weighted blending.

In some embodiments, in TIMD, a flag needs to be transmitted to the decoding end, so as to indicate whether the TIMD technology is used for the current CU.

As can be seen from above, prediction mode derivation in the TIMD technology can reduce some burden of syntax element transmission, so that overhead of prediction modes can be reduced from original at least 5 bits to 1 bit. In addition, in TIMD, after information of the prediction modes is obtained, the prediction values corresponding the optimal prediction mode and the sub-optimal prediction mode are blended to generate a new prediction value. Neither can the new prediction value be obtained by using any one of the aforementioned prediction modes, nor can the same prediction value be obtained by any subsequent prediction tools. Through experimental comparison, it can be found that the blending does improve the prediction efficiency.

However, the prediction value obtained by weighted blending is applicable to video contents in natural scenes, but is not applicable to video contents in specific scenes. Objects in the former video contents often have relatively fuzzy edges and include some noise caused by shooting, and prediction values that better match with these objects can be obtained using the TIMD blending. Objects in the latter video contents are often characterized by sharpness and colour vividness, and these video contents are often computer-recorded or referred to as screen content videos. In such contents, prediction values generated in the TIMD blending are redundant, which reduces the prediction quality and even brings noise.

Therefore, in some image contents, the use of the TIMD blending not only fails to improve the compression efficiency, but also reduces the prediction quality and introduces unnecessary noise.

In order to solve the above technical problems, in the present disclosure, the weighted blending condition is determined according to the image content of the current sequence, that is, different image contents may correspond to different weighted blending conditions. Then, whether to perform weighted blending prediction on the current block is determined according to the weighted blending condition corresponding to the image content of the current sequence. In this way, weighted blending prediction will not be performed on the image content that does not require weighted blending prediction, so that prediction quality will not be reduced and unnecessary noise can be avoided, thereby improving accuracy of intra prediction.

It may be noted that the intra prediction method provided in embodiments of the present disclosure, in addition to being applied to the above TIMD technology, can be applied to any scene where two or more intra prediction modes are allowed for weighted blending prediction.

A video coding method provided in embodiments of the present disclosure will be introduced in combination with embodiments below.

Figure 8:
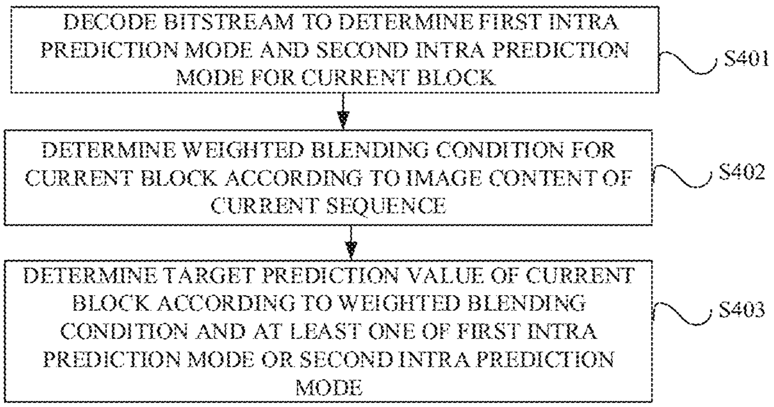
FIG. 8 is a schematic flowchart of an intra prediction method provided in embodiments of the present disclosure.

Taking a decoding end as an example, a video decoding method provided in embodiments of the present disclosure is first introduced with reference to FIG. 8.

FIG. 8 is a schematic flowchart of an intra prediction method provided in embodiments of the present disclosure. Embodiments of the present disclosure are applicable to the video decoder as illustrated in FIG. 1 and FIG. 3. As illustrated in FIG. 8, the method of embodiments of the present disclosure includes the following.

At S401, a bitstream is decoded to determine a first intra prediction mode and a second intra prediction mode for a current block.

In some embodiments, the current block may also be referred to as a current decoding block, a current decoding unit, a decoding block, a block to-be-decoded, a current block to-be-decoded, etc.

In some embodiments, for the current block that includes a chroma component and does not include a luma component, the current block may be referred to as a chroma block.

In some embodiments, for the current block that includes the luma component and does not include the chroma component, the current block may be referred to as a luma block.

It may be noted that, when the video decoder determines that weighted blending prediction with two intra prediction modes is allowed for the current block, the video decoder determines the first intra prediction mode and the second intra prediction mode. When the video decoder determines that the first intra prediction mode and the second intra prediction mode satisfy a weighted blending condition, the video decoder predicts the current block by using the first intra prediction mode to obtain a first prediction value of the current block, predicts the current block by using the second intra prediction mode to obtain a second prediction value of the current block, and obtains a target prediction value of the current block by performing weighted blending on the first prediction value and the second prediction value.

In some embodiments, when the video decoder determines that the first intra prediction mode and the second intra prediction mode do not satisfy the weighted blending condition, the video decoder predicts the current block by using one of the first intra prediction mode or the second intra prediction mode to obtain the target prediction value of the current block.

In some embodiments, the video decoder may use the following manner to determine that weighted blending prediction with two intra prediction modes is allowed for the current block. A second flag is signalled into a bitstream by a video encoder, where the second flag indicates whether the target prediction value of the current block is determined according to at least one of the first intra prediction mode or the second intra prediction mode. If the video encoder determines the target prediction value according to at least one of the first intra prediction mode or the second intra prediction mode, then the second flag is set as true, for example, a value of the second flag is set as 1. Then the second flag that is set as true is signalled into the bitstream, for example, signalled into a header of the bitstream. In this way, after obtaining the bitstream, the video decoder decodes the bitstream to obtain the second flag. If the second flag is true, for example, the value of the second flag is 1, then the video decoder determines that the target prediction value of the current block is determined according to at least one of the first intra prediction mode or the second intra prediction mode. In this case, the video decoder determines the first intra prediction mode and the second intra prediction mode for the current block. Optionally, a manner in which the video decoder determines the first intra prediction mode and the second intra prediction mode is the same as a manner in which the video encoder determines the first intra prediction mode and the second intra prediction mode.

If the video encoder does not determine the target prediction value of the current block according to at least one of the first intra prediction mode or the second intra prediction mode, then the second flag is set as false, for example, the value of the second flag is set as 0. Then the second flag that is set as false is signalled into the bitstream, for example, signalled into the header of the bitstream. The video decoder decodes the bitstream to obtain the second flag. If the second flag is false, for example, the value of the second flag is 0, the video decoder does not determine the first intra prediction mode and the second intra prediction mode for the current block. Instead, the decoder determines, by traversing preset intra prediction modes, an intra prediction mode with a lowest cost to predict the current block, so as to obtain the target prediction value of the current block.

It may be noted that embodiments of the present disclosure mainly involve a case where the target prediction value of the current block is determined according to at least one of the first intra prediction mode or the second intra prediction mode. That is to say, the present disclosure mainly focuses on the case where the second flag is true.

In a possible implementation, if the TIMD technology is used in the present disclosure, the second flag may be a TIMD enable flag, such as sps_timd_enable_flag. That is to say, in embodiments of the present disclosure, the video decoder decodes the bitstream to obtain a TIMD allowed flag, where the TIMD allowed flag is a sequence-level flag. The TIMD allowed flag indicates whether the TIMD technology is allowed for a current sequence. If the TIMD allowed flag is true, for example, equal to 1, then it is determined that the TIMD technology is allowed for the current sequence. Then, the video decoder continues to decode the bitstream to obtain the TIMD enable flag, where the TIMD enable flag may be a sequence-level flag. The TIMD enable flag indicates whether the TIMD technology is used for the current block. If the TIMD enable flag is true, for example, equal to 1, then it is determined that the TIMD technology is used for the current block. In this case, the video decoder determines the first intra prediction mode and the second intra prediction mode for the current block.

Optionally, the TIMD enable flag may also be a picture-level flag, which indicates whether the TIMD technology is used for a current picture.

It may be noted that, the TIMD enable flag being true or false is determined by the video encoder and signalled into the bitstream. For example, if the video encoder uses the TIMD technology to determine the target prediction value of the current block, then the TIMD enable flag is set as true, for example, set as 1, and the TIMD enable flag is signalled into the bitstream, for example, signalled into the header of the bitstream. If the video encoder does not use the TIMD technology to determine the target prediction value of the current block, the TIMD enable flag is set as false, for example, set as 0, and the TIMD enable flag is signalled into the bitstream, for example, signalled into the header of the bitstream. In this way, the video decoder can parse out the TIMD enable flag from the bitstream, and determine according to the TIMD enable flag whether the TIMD technology is used to determine the target prediction value of the current block. Therefore, consistency between the decoding end and the encoding end can be ensured, and further reliability of prediction can be ensured.

When the video decoder determines that the target prediction value of the current block needs to be determined according to at least one of the first intra prediction mode or the second intra prediction mode, the video decoder performs the operation of determining the first intra prediction mode and the second intra prediction mode for the current block at S401.

In the present disclosure, manners for determining the first intra prediction mode and the second intra prediction mode for the current block at S401 include but are not limited to the following.

Manner I, a preset intra prediction list is traversed, from which an intra prediction mode with a lowest cost is selected as the first intra prediction mode and an intra prediction mode with a second lowest cost is selected as the second intra prediction mode.

The preset intra prediction list may include any one intra coding mode such as a direct current (DC) mode, a Planar mode, and an angular mode.

In Manner I, the video decoder performs predictive coding on the current block by using each of different intra prediction modes in the preset intra prediction list, and then calculates a cost corresponding to each of the multiple prediction modes. The video decoder then determines an intra prediction mode corresponding to a lowest cost as the first intra prediction mode for the current block, and determines an intra prediction mode corresponding to a second lowest cost as the second intra prediction mode for the current block.

Optionally, the cost corresponding to each of the prediction modes may be SAD or SATD, etc. that is used as an approximate cost of that prediction mode. Optionally, the SAD and the SATD may be determined according to the current block and the prediction values of the current block. For example, the current block is predicted by using a certain intra prediction mode to obtain the prediction value of the current block, and sample differences between the current block and the prediction values of the current block are used to determine the SAD corresponding to that intra prediction mode. Differences between the current block and the prediction values of the current block are calculated to obtain residual values of the current block, Hadamard transform is performed on the residual values, and then the sum of absolute values of elements is calculated, so that the SATD corresponding to the intra prediction mode can be obtained.

Assuming that the preset intra prediction list includes 66 intra prediction modes, the first intra prediction mode has 66 possibilities, and the second intra prediction mode has 65 possibilities since the second intra prediction mode is different from the first intra prediction mode. In this disclosure, any two different intra prediction modes may be used, and thus there are 66×65 possibilities. As can be seen, in the present disclosure, it is time-consuming and inefficient to traverse all the intra prediction modes in the intra prediction list. Therefore, this disclosure may limit the selectable intra prediction modes.

Manner II, the first intra prediction mode and the second intra prediction mode for the current block are determined according to MPMs for the current block. That is, the operations at S401 include operations at S401-A1 and S401-A2 below.

At S401-A1, MPMs for the current block are determined.

At S401-A2, the first intra prediction mode and the second intra prediction mode are determined according to the MPMs.

In intra prediction, an MPM list-based intra mode coding technology can be used to improve coding efficiency. The MPM list is constructed with intra prediction modes for surrounding coded blocks, intra prediction modes that are derived from the intra prediction modes for the surrounding coded blocks, such as adjacent modes, and some commonly-used or high-probability intra prediction modes, such as DC, Planar, and Bilinear modes. Reference to the intra prediction modes for the surrounding coded blocks utilizes spatial correlation. Since textures have a certain spatial continuity, an MPM may be used as an intra prediction mode for prediction. That is, it is considered that the probability of using the MPM for the current block is higher than the probability of not using the MPM. Therefore, during binarization, fewer codewords will be assigned for the MPM list to save overhead and improve coding efficiency.

As can be seen from above, the MPM list is formed according to intra prediction modes for decoded regions around the current block. In this way, the video decoder obtains the intra prediction modes used for picture blocks in the decoded regions around the current block, so as to form the MPM list for the current block. For example, the MPM list for the current block is constructed with intra prediction modes for a top region, a top-left region, a top-right region, etc. of the current block.

In some embodiments, if the TIMD technology is used in the present disclosure, then as illustrated in FIG. 7, the MPM list for the current block is constructed with intra prediction modes for decoded regions among a top-right region, a top region, a top-left region, a left region, and a bottom-left region of the current block. For example, intra prediction mode 1 was used for decoding the top-right region, intra prediction mode 2 was used for decoding the top region, intra prediction mode 3 was used for decoding the top-left region, intra prediction mode 2 was used for decoding the left region, and intra prediction mode 4 was used for decoding the bottom-left region. Therefore, it can be determined that the MPM list for the current block includes intra prediction mode 1, intra prediction mode 2, intra prediction mode 3, and intra prediction mode 4.

It may be noted that, if some regions among the top-right region, the top region, the top-left region, the left region, and the bottom-left region of the current block have not been decoded, the MPM list for the current block is constructed with the intra prediction modes corresponding to the decoded regions among these regions.

Optionally, if the current block is a block to be firstly decoded, that is, no decoded region exists around the current block, several intra prediction modes may be selected from multiple preset intra prediction modes to construct the MPM list for the current block.

Optionally, if the current block is a block to be firstly decoded, then the method described in Manner I is used, all intra prediction modes in the preset intra prediction list are traversed to obtain the first intra prediction mode with the lowest cost and the second intra prediction mode with the second lowest cost.

After the MPM list for the current block is determined according to the above method, the first intra prediction mode and the second intra prediction mode are determined according to the MPM list. For ease of illustration, an intra prediction mode in the MPM list is referred to as a candidate intra prediction mode. Manners for determining the first intra prediction mode and the second intra prediction mode according to the MPM list include but are not limited to the following examples.

Example 1, one candidate intra prediction mode in the above MPM list is determined as the first intra prediction mode, and one candidate intra prediction mode in the MPM list other than the first intra prediction mode is determined as the second intra prediction mode. For example, any one candidate intra prediction mode in the MPM list is determined as the first intra prediction mode, and any one candidate prediction mode in the MPM list other than the first intra prediction mode is determined as the second intra prediction mode.

Example 2, costs when predicting the current block using the candidate intra prediction modes respectively in the MPM list are determined, and the first intra prediction mode and the second intra prediction mode are determined according to the costs corresponding to the candidate intra prediction modes in the MPM list. For example, predictive coding is performed on the current block by using each of the candidate intra prediction modes in the MPM list, so as to obtain the cost corresponding to each of the candidate intra prediction modes. Next, the first intra prediction mode and the second intra prediction mode are determined according to the costs corresponding to the respective candidate intra prediction modes in the MPM list. For example, a candidate intra prediction mode with a lowest cost in the MPM list is determined as the first intra prediction mode, and a candidate intra prediction mode with a second lowest cost in the MPM list is determined as the second intra prediction mode.

Optionally, the above cost may be SAD or SATD, etc., which is not limited in the present disclosure.

In Manner II, the MPM list for the current block is determined, and the first intra prediction mode and the second intra prediction mode for the current block are determined according to the costs when performing predictive coding on the current block using the candidate intra prediction modes respectively in the MPM list. Since the MPM list includes fewer intra prediction modes, the complexity of determining the first intra prediction mode and the second intra prediction mode is reduced, and the speed of determining the first intra prediction mode and the second intra prediction mode is improved, thereby improving the prediction efficiency.

If the TIMD technology is used in the present disclosure, the first intra prediction mode and the second intra prediction mode for the current block are determined by using Manner III below.

Manner III, the first intra prediction mode and the second intra prediction mode for the current block are determined based on the TIMD technology. That is, the operations at S401 include operations at S401-B1 and S401-B2 below.

At S401-B1, the bitstream is decoded to obtain a TIMD enable flag, where the TIMD enable flag indicates whether a TIMD technology is used for the current block.

At S401-B2, when the TIMD enable flag indicates that the TIMD technology is used for the current block, the first intra prediction mode and the second intra prediction mode for the current block are determined.

As can be seen from above, the TIMD technology refers to deriving an intra prediction mode based on a template. Based on the TIMD technology, after obtaining the bitstream, the video decoder decodes the bitstream to obtain the TIMD enable flag. If the TIMD enable flag is true, for example, the value of the TIMD enable flag is 1, then it is determined that the TIMD technology is used for the current block to determine the target prediction value of the current block. In this case, the first intra prediction mode and the second intra prediction mode for the current block may be determined by performing predictive coding on the template (s) of the current block illustrated in FIG. 7, instead of determining the first intra prediction mode and the second intra prediction mode by directly performing predictive coding on the current block. Since the template of the current block is a reconstructed region, the effect of the intra prediction mode may be determined according to differences between prediction values and reconstructed values of the template, so that the first intra prediction mode and the second intra prediction mode for the current block can be determined accurately and quickly.

Manners for determining the first intra prediction mode and the second intra prediction mode for the current block at S401-B2 include but are not limited to the following examples.

Example 1, the preset intra prediction mode list is traversed, and predictive coding is performed on the template of the current block by using each of the intra prediction modes in the intra prediction mode list to obtain a prediction value corresponding to each of the prediction modes. Next, the prediction value corresponding to each of the prediction modes is compared with the reconstructed value of the template. For example, a cost such as SAD or SATD between the prediction value corresponding to that prediction mode and the reconstructed value of the template is calculated. A prediction mode with a lowest cost is determined as the first intra prediction mode for the current block, and a prediction mode with a second lowest cost is determined as the second intra prediction mode for the current block.

Example 2, the first intra prediction mode and the second intra prediction mode for the current block are determined according to operations at S401-B21 and S401-B22 below.

At S401-B21, an MPM list for the current block is determined, when the TIMD enable flag indicates that the TIMD technology is used for the current block and at least one of multiple reference reconstruction samples of the current block exists.

At S401-B22, the first intra prediction mode and the second intra prediction mode for the current block are determined according to the MPM list.

In Example 2, the multiple reference reconstruction samples of the current block can be understood as reconstructed regions around the current block, and in Example 2, the MPM list for the current block is determined according to intra prediction modes for the multiple reference reconstruction samples around the current block. The multiple reference reconstruction samples of the current block are predetermined, for example, a top reconstructed-region of the current block is determined as one reconstruction sample of the current block, and a left reconstructed-region of the current block is determined as one reconstruction sample of the current block, etc.

In some embodiments, as illustrated in FIG. 7, the top-right region, the top region, the top-left region, the left region, and the bottom-left region of the current block are referred to as the reference reconstruction samples of the current block. Some of these reference reconstruction samples exist, i.e., valid, and some of these reference reconstruction samples may not exist, i.e., invalid. For example, the left region of the current block has been reconstructed, and the top region of the current block has not been reconstructed, which means that the reference reconstruction sample of the left region of the current block exists (i.e., valid) and the reference reconstruction sample of the top region of the current block does not exist (i.e., invalid).

In Example 2, if the TIMD enable flag indicates that the TIMD technology is used for the current block and at least one of the multiple reference reconstruction samples of the current block exists, the MPM list for the current block is constructed according to an intra prediction mode(s) corresponding to the reference reconstruction sample(s) that exists. For example, if K reference reconstruction samples of the current block exist and intra prediction modes used for intra prediction are respectively intra prediction mode 1, intra prediction mode 2, . . . , and intra prediction mode K, then the MPM list for the current block is constructed with intra prediction mode 1, intra prediction mode 2, . . . , and intra prediction mode K. Optionally, K is a positive integer less than 5.

After the MPM list for the current block is determined according to the above operations, the first intra prediction mode and the second intra prediction mode for the current block are determined according to the MPM list.

For example, if the number of intra prediction modes in the MPM list is greater than 1, any one intra prediction mode in the MPM list is determined as the first intra prediction mode for the current block, and any one intra prediction mode in the MPM list other than the first intra prediction mode is determined as the second intra prediction mode for the current block.

In some embodiments, if the number of intra prediction modes in the MPM list is equal to 1, the intra prediction mode in the MPM list is determined as the first intra prediction mode, and one of other intra prediction modes is determined as the second intra prediction mode for the current block. For example, an intra prediction mode with the lowest cost among the other intra prediction modes is determined as the second intra prediction mode.

In some embodiments, if the number of intra prediction modes in the MPM list is equal to 1, the intra prediction mode in the MPM list is determined as the first intra prediction mode, and a Planar mode is determined as the second intra prediction mode.

In some embodiments, if the number of intra prediction modes in the MPM list is equal to 1, it is determined that weighted blending prediction is not performed on the current block, and the current block is predicted by using the intra prediction mode in the MPM list to obtain the target prediction value of the current block.

In some embodiments, if the number of candidate intra prediction modes in the MPM list is greater than 1, costs when predicting the template region of the current block using the candidate intra prediction modes respectively in the MPM list are determined, and the first intra prediction mode and the second intra prediction mode are determined according to the costs corresponding to the candidate intra prediction modes in the MPM list. For example, a candidate intra prediction mode with a lowest cost in the MPM list is determined as the first intra prediction mode, and a candidate intra prediction mode with a second lowest cost in the MPM list is determined as the second intra prediction mode.

Optionally, the above cost may be SAD or SATD, etc.

In an example, the above process of determining the costs when predicting the template region of the current block using the candidate intra prediction modes respectively in the MPM list may be as follows. For each of the candidate intra prediction modes in the MPM list, a prediction value of the template region of the current block is determined by using the candidate intra prediction mode, and a cost corresponding to the candidate intra prediction mode is determined according to the prediction value corresponding to the candidate intra prediction mode and the reconstructed value of the template region. Specifically, for a candidate intra prediction mode in the MPM list, a prediction value of the template region of the current block is obtained by using the candidate intra prediction mode, and the reconstructed value is known because the template region is a reconstructed region. Next, a cost corresponding to the candidate intra prediction mode is determined according to the prediction value corresponding to the intra prediction mode and the reconstructed value of the template region. For example, the SAD or SATD between the prediction value corresponding to the intra prediction mode and the reconstructed value of the template region is determined as the cost of the candidate intra prediction mode.

In some embodiments, if the TIMD enable flag indicates that the TIMD technology is used for the current block and each of the multiple reference reconstruction samples of the current block does not exist, the video decoder does not determine the first intra prediction mode and the second intra prediction mode for the current block. Instead, the video decoder predicts the current block by using the Planar mode to obtain the target prediction value of the current block.

According to any one of Manner I, Manner II, and Manner III, the first intra prediction mode and the second intra prediction mode for the current block can be determined.

In some embodiments, in Manner II and Manner III, the first intra prediction mode and the second intra prediction mode are determined according to the costs corresponding to the candidate intra prediction modes in the MPM list as follows.

Manner 1, a candidate intra prediction mode with a lowest cost in the MPM list is determined as the first intra prediction mode, and a candidate intra prediction mode with a second lowest cost in the MPM list is determined as the second intra prediction mode.

Manner 2, the candidate intra prediction mode with the lowest cost in the MPM list is determined as a first initial mode, and the candidate intra prediction mode with the second lowest cost in the MPM list is determined as a second initial mode. When at least one of the first initial mode or the second initial mode is an angular prediction mode, the angular prediction mode of the first initial mode and the second initial mode is offset according to a preset offset, so as to obtain the first intra prediction mode and the second intra prediction mode.

In some embodiments, if the first initial mode is the angular prediction mode, then taking the first initial mode as a central prediction direction, the first initial mode is offset to the left by a certain angle to obtain $mode1^{+}$ and is offset to the right by a certain angle to obtain $mode1^{-}$. Costs when predicting the template region of the current block using $mode1^{+}$ and $mode1^{-}$ respectively are determined, and a prediction mode with the lowest cost among $mode1^{+}$, $mode1^{-}$, and the first initial mode is determined as the first intra prediction mode.

In some embodiments, if the second initial mode is the angular prediction mode, then taking the second initial mode as the central prediction direction, the second initial mode is offset to the left by a certain angle to obtain $mode2^{+}$ and is offset to the right by a certain angle to obtain $mode2^{-}$. Costs when predicting the template region of the current block using $mode2^{+}$ and $mode2^{-}$ respectively are determined, and a prediction mode with the lowest cost among $mode2^{+}$, $mode2^{-}$, and the second initial mode is determined as the second intra prediction mode.

In some embodiments, if neither the first initial mode nor the second initial mode is the angular prediction mode, the first initial mode is determined as the first intra prediction mode, and the second initial mode is determined as the second intra prediction mode.

After the first intra prediction mode and the second intra prediction mode for the current block are determined according to the above method, operations at S402 and S403 are executed as follows.

At S402, a weighted blending condition for the current block is determined according to an image content of a current sequence.

The weighted blending condition is used to determine whether weighted prediction is performed on the current block based on the first intra prediction mode and the second intra prediction mode.

At S403, a target prediction value of the current block is determined according to the weighted blending condition and at least one of the first intra prediction mode or the second intra prediction mode.

In embodiments of the present disclosure, after the video decoder obtains the first intra prediction mode and the second intra prediction mode for the current block according to the operations at S401, the video decoder does not perform weighted prediction on the current block by directly using the first intra prediction mode and the second intra prediction mode, but needs to determine whether the first intra prediction mode and the second intra prediction mode satisfy the weighted blending condition for the current block. If the first intra prediction mode and the second intra prediction mode satisfy the weighted blending condition for the current block, weighted prediction is performed on the current block by using the first intra prediction mode and the second intra prediction mode. For example, the current block is predicted by using the first intra prediction mode to obtain a first prediction value, the current block is predicted by using the second intra prediction mode to obtain a second prediction value, and the target prediction value of the current block is obtained by weighting the first prediction value and the second prediction value. Weights for weighting the first prediction value and the second prediction value may be determined according to a cost of the first intra prediction mode and a cost of the second intra prediction mode. For example, the cost when predicting the current block using the first intra prediction mode is denoted as a first cost cost1, and the cost when predicting the current block using the second intra prediction mode is denoted as a second cost cost2, where the first cost and the second cost may be SAD or SATD, etc. weight1 is a weight corresponding to the first prediction value, and weight2 is a weight corresponding to the second prediction value. Optionally, weight1=cost2/(cost1+cost2), and weight2=1−weight1. In this way, the target prediction value of the current block can be obtained by weighting the first prediction value and the second prediction value according to the above formula (3).

If the first intra prediction mode and the second intra prediction mode do not satisfy the weighted blending condition for the current block, the current block is predicted by using one of the first intra prediction mode or the second intra prediction mode to obtain the target prediction value of the current block. For example, the current block is predicted by using a prediction mode with the lowest cost in the first intra prediction mode and the second intra prediction mode to obtain the target prediction value of the current block. Optionally, as can be seen from description of S401, the first intra prediction mode is the intra prediction mode with the lowest cost among the multiple prediction modes, and the second intra prediction mode is the intra prediction mode with the second lowest cost among the multiple prediction modes, that is, the first cost is less than the second cost. Therefore, when the first intra prediction mode and the second intra prediction mode do not satisfy the weighted blending condition for the current block, the current block is predicted by using the first intra prediction mode to obtain the target prediction value of the current block.

The current weighted blending condition is fixed, that is, the weighted blending condition for the current block does not change with the image content. However, some image contents such as screen-recorded image contents are often characterized by sharpness and colour vividness. When weighted blending prediction is performed on these image contents, sharpness and colour vividness are reduced because weighted blending prediction can be understood as a fuzzy prediction method, so that the prediction quality is reduced and noise is brought.

To solve the above technical problems, in the present disclosure, the weighted blending condition for the current block is determined according to the image content. That is to say, this disclosure provides differentiated weighted blending conditions for image contents, and different image contents correspond to different weighted blending conditions, so that it can be ensured that weighted blending prediction is performed on image contents that require weighted blending prediction, thereby improving prediction accuracy. Weighted blending prediction is not performed on the image content that does not require weighted blending prediction, thereby avoiding unnecessary noise and ensuring prediction quality.

A sequence includes a series of pictures, and since the series of pictures is often generated in the same environment, image contents of the series of pictures are substantially the same. Therefore, in the present disclosure, the weighted blending condition for the current block is determined according to the image content of the current sequence. It may be understood that the image content of the current block is of the same type as the image content of the current sequence, for example, both are screen contents or other contents captured by a camera, etc.

In some embodiments, a video decoding device may obtain the image content of the current sequence by means of image recognition. For example, during decoding the current sequence, the video decoding device first decodes reconstructed pictures of the first few pictures, such as 2 pictures, in the current sequence in an existing manner. A type of image contents of the reconstructed pictures of the first few pictures is obtained by means of image recognition on the reconstructed pictures of the first few pictures, and the type of image contents of the reconstructed pictures of the first few pictures is used as the type of image contents of the current sequence. In an example, the method in which the video decoding device obtains the type of image contents of the reconstructed pictures of the first few pictures by means of image recognition on the reconstructed pictures of the first few pictures may be a neural network model-based method. For example, the neural network model is a pre-trained model that can recognize a type of image contents. The video decoding device inputs the reconstructed pictures of the first few pictures into the neural network model, so as to obtain the type of image contents of the reconstructed pictures of the first few pictures that is output by the neural network model. Optionally, the video decoding device may also determine the type of image contents of the reconstructed pictures of the first few pictures by using other manners, and this disclosure is not limited in this regard.

In some embodiments, the video decoding device may obtain the image content of the current sequence according to indication information in the bitstream. For example, a video encoding device signals into the bitstream a type of the image content of the current sequence through a flag. The video decoding device decodes the bitstream to obtain the flag, and determines the type of the image content of the current sequence according to the flag. For example, when a value of the flag is 1, it indicates that the image content of the current sequence is a first image content. When the value of the flag is 0, it indicates that the image content of the current sequence is a second image content. The first image content is different from the second image content.

After the image content of the current sequence is obtained according to the above method, the weighted blending condition for the current block is determined according to the image content of the current sequence. For example, when the image content of the current sequence is the first image content, the weighted blending condition for the current block is determined as a first blending condition. When the image content of the current sequence is the second image content, the weighted blending condition for the current block is determined as a second blending condition. When the image content of the current sequence is a third image content, the weighted blending condition for the current block is determined as a third blending condition . . . , and when the image content of the current sequence is the N-th image content, the weighted blending condition for the current block is determined as the N-th blending condition. The specific correspondence is illustrated in Table 1.

TABLE 1

| Type of image content | Type of weighted blending condition |
|---|---|
| First image content | First blending condition |
| Second image content | Second blending condition |
| . . . | . . . |
| N-th image content | N-th blending condition |

Table 1 illustrates that different image contents correspond to different weighted blending conditions, and Table 1 is preset. Therefore, after determining the image content of the current sequence, the video decoding device can determine the weighted blending condition corresponding to the image content of the current sequence as the weighted blending conditions for the current block by searching Table 1.

In some embodiments, for determining the weighted blending condition for the current block according to the image content of the current sequence, operations at S402 include the following operations.

At S402-A, the bitstream is decoded to obtain a first flag, where the first flag indicates whether a first technology is used, and the first technology is used for a first image content.

At S402-B, the weighted blending condition for the current block is determined according to the first flag.

In the present disclosure, the first image content may be an image content that is characterized by sharpness and colour vividness, such as a screen-recorded content.

In some embodiments of the present disclosure, it may be understood that the weighted blending condition may change only when the image content of the current sequence is the first image content, and the weighted blending condition does not change when the image content of the current sequence is not the first image content. That is to say, if the image content of the current sequence is the first image content, the weighted blending condition to be used is the first blending condition, and if the image content of the current sequence is not the first image content, the weighted blending condition to be used is the second blending condition. The first blending condition is different from the second blending condition.

Based on this, in order to improve the efficiency of determining the weighted blending condition for the current block by the video decoder, if the video encoder determines that the image content corresponding to the current block is the first image content, the video encoder determines that the first technology can be used for the current block. The first technology can be understood as a technology provided in embodiments of the present disclosure, that is, the weighted blending condition for the current block is determined according to amplitude values of the first intra prediction mode and the second intra prediction mode. If the video encoder determines that the first technology can be used for the current block, the video encoder sets the first flag as true and then signals the first flag into the bitstream, for example, a value of the first flag is 1. If the video encoder determines that the image content corresponding to the current block is not the first image content, the video encoder determines that the first technology cannot be used for the current block. In this case, the video encoder sets the first flag as false and then signals the first flag into the bitstream, for example, the value of the first flag is 0. In this way, the video decoder decodes the bitstream to obtain the first flag, and then determines the weighted blending condition for the current block according to the first flag.

Optionally, the first flag may be a sequence-level flag, which indicates whether the first technology can be used for the current sequence.

Optionally, the first flag may be a picture-level flag, which indicates whether the first technology can be used for a current picture.

Optionally, a new field is added to the bitstream to represent the first flag. For example, a field sps_timd_blendoff_flag is used to represent the first flag, and the field is an entirely new field.

Optionally, the first flag is reused with a third flag of the current sequence, that is, an existing field in the current sequence can be reused without adding a new field, thereby saving codewords. For example, the third flag is an intra-block copy (IBC) enable flag or a template matching prediction (TMP) enable flag, etc.

In some embodiments, the weighted blending condition for the current block may be determined from multiple preset weighted blending conditions according to the first flag. For example, Table 2 illustrates the weighted blending condition corresponding to the first flag.

TABLE 2

| Value of first flag | Type of weighted blending condition |
|---|---|
| 1 | First blending condition |
| 0 | Second blending condition |

Table 2 illustrates weighted blending conditions corresponding to different values of the first flag. When the value of the first flag is 1, it indicates that the image content of the current sequence is the first image content and the corresponding weighted blending condition is the first blending condition. When the value of the first flag is 0, it indicates that the image content of the current sequence is not the first image content and the corresponding weighted blending condition is the second blending condition. Based on Table 2, the video decoding device decodes the bitstream to obtain the first flag, and finds from Table 2 the weighted blending condition for the current block according to the value of the first flag. For example, when the value of the first flag is 1, it is determined that the weighted blending condition for the current block is the first blending condition, and when the value of the first flag is 0, it is determined that the weighted blending condition for the current block is the second blending condition.

In this embodiment, the weighted blending condition for the current block is obtained by searching Table 2 according to the first flag.

In some embodiments, for determining the weighted blending condition for the current block according to the first flag, operations at S402-B include the following operations.

At S402-B1, when the first flag indicates that the first technology is used, a first blending condition for the current block is determined.

At S402-B2, the first blending condition is determined as the weighted blending condition for the current block.

In this embodiment, the video decoder decodes the bitstream to obtain the first flag. If the first flag indicates that the first technology is used by the current video decoder, for example, if the value of the first flag is 1, which indicates that the first technology can be used by the current video decoder, then the video decoder determines that the weighted blending condition for the current block needs to be modified and the existing weighted blending condition cannot be used. In this case, the video decoder re-determines the weighted blending condition for the current block. Specifically, the video decoder determines the first blending condition for the current block and determines the first blending condition as the weighted blending condition for the current block.

Methods for determining the first blending condition for the current block at S402-B1 include but are not limited to the following.

First method: a value of a first threshold coefficient is modified as a first preset value, and the first blending condition is determined according to a first cost corresponding to the first intra prediction mode, a second cost corresponding to the second intra prediction mode, and the modified first threshold coefficient.

The first threshold coefficient is used to determine the first blending condition.

In some embodiments, the first threshold coefficient has a default value, for example, 2 or another value. In embodiments of the present disclosure, if the image content of the current sequence is the first image content (for example, the screen-recorded content), the first threshold coefficient is modified, for example, modified from the default value to the first preset value. Then, the first blending condition is determined according to the first cost corresponding to the first intra prediction mode, the second cost corresponding to the second intra prediction mode, and the modified first threshold coefficient.

Optionally, the first preset value is less than the default value of the first threshold coefficient.

Optionally, the first preset value is a positive number less than 2, for example, 1.9 or 1.95, etc.

In this first method, there is no limitation on methods for determining the first blending condition according to the first cost corresponding to the first intra prediction mode, the second cost corresponding to the second intra prediction mode, and the modified first threshold coefficient.

In an example, a ratio of the second cost to the first cost being less than the modified first threshold coefficient is determined as the first blending condition for the current block. For example, the first blending condition for the current block is $cost2/cost1<a1$, where cost1 is the first cost corresponding to the first intra prediction mode, cost2 is the second cost corresponding to the second intra prediction mode, and a1 is the modified first threshold coefficient.

In embodiments of the present disclosure, it is assumed that a value of the unmodified first threshold coefficient is a, a value of the modified first threshold coefficient is a1, and a is greater than a1. It is assumed that the existing weighted blending condition is $cost2/cost1<a$, and the modified weighted blending condition in the present disclosure is $cost2/cost1<a1$. Since a1 is less than a and cost1 is less than cost2, the modified weighted blending condition in the present disclosure is much stricter. For example, when cost2 satisfies the unmodified weighted blending condition, a value of cost2 is in a range of $cost1<cost2<a*cost1$, and when cost2 satisfies the modified weighted blending condition, the value of cost2 is in a range of $cost1<cost2<a1*cost1$. Since a1 is less than a, the value of cost2 will be in the smaller range to make cost2 satisfy the modified weighted blending condition, so that it is difficult for the first intra prediction mode and the second intra prediction mode to satisfy the modified weighted blending condition in the present disclosure. Therefore, when the modified weighted blending condition is used to determine whether to perform weighted prediction, the probability of weighted prediction on the current block of the first image content can be reduced, thereby ensuring prediction quality of the current block of the first image content.

In another example, the second cost being less than a product of the first cost and the modified first threshold coefficient is determined as the first blending condition for the current block. For example, the first blending condition for the current block is $cost2<a1*cost1$.

In this example, it is assumed that the value of the unmodified first threshold coefficient is a, the value of the modified first threshold coefficient is a1, and a is greater than a1. It is assumed that the existing weighted blending condition is $cost2<a*cost1$, and the modified weighted blending condition in the present disclosure is $cost2<a1*cost1$. Since a1 is less than a and cost1 is less than cost2, the modified weighted blending condition in the present disclosure is much stricter. For example, when cost2 satisfies the unmodified weighted blending condition, the value of cost2 is in the range of $cost1<cost2<a*cost1$, and when cost2 satisfies the modified weighted blending condition, the value of cost2 in the range of $cost1<cost2<a1*cost1$. Since a1 is less than a, the value of cost2 will be in the smaller range to make cost2 satisfy the modified weighted blending condition, so that it is difficult for the first intra prediction mode and the second intra prediction mode to satisfy the modified weighted blending condition in the present disclosure. Therefore, when the modified weighted blending condition is used to determine whether to perform weighted prediction, the probability of weighted prediction on the current block of the first image content can be reduced, thereby ensuring prediction quality of the current block of the first image content.

In this first method, assuming that the first blending condition for the current block is $cost2<a1*cost1$, then for determining the target prediction value of the current block according to the weighted blending condition and at least one of the first intra prediction mode or the second intra prediction mode, operations at S403 include operations at S403-A1 below.

At S403-A1, when the second cost is less than the product of the first cost and the modified first threshold coefficient, the target prediction value of the current block is determined by using the first intra prediction mode and the second intra prediction mode.

That is to say, when $cost2<a1*cost1$, it indicates that the first intra prediction mode and the second intra prediction mode satisfy the weighted blending condition for the current block, and thus weighted prediction is performed on the current block by using the first intra prediction mode and the second intra prediction mode to obtain the target prediction value of the current block. For example, the current block is predicted by using the first intra prediction mode to obtain a first prediction value, the current block is predicted by using the second intra prediction mode to obtain a second prediction value, and the target prediction value of the current block is obtained by weighting the first prediction value and the second prediction value. For example, according to the weighting method illustrated in the formula (1) to the formula (3) above, a weighting operation is performed to obtain the target prediction value of the current block.

It may be noted that weights for the weighting operation of the first prediction value and the second prediction value may be derived by using a weight matrix, in addition to using the calculation method in the formula (1) and the formula (2). For example, geometric partitioning mode (GPM) has 64 weight-partition modes, and angular weighted prediction (AWP) has 56 weight-partition modes. In the present disclosure, one of the 64 weight-partition modes of GPM or one of the 56 weight-partition modes of AWP may be selected, and the weight distribution corresponding to the selected mode is used to determine weights of the first prediction value corresponding to the first intra prediction mode and the second prediction value corresponding to the second intra prediction mode. For example, if the first intra prediction mode is an angular prediction mode, weight distribution corresponding to a weight-partition mode with an angle that coincides or approximately coincides with an angle of the first intra prediction mode may be used to determine weights corresponding to the first prediction value and the second prediction value.

In some embodiments, the operations at S403 further include operations at S403-A2 below.

At S403-A2, when the second cost is greater than or equal to the product of the first cost and the modified first threshold coefficient, the target prediction value of the current block is determined by using the first intra prediction mode.

In embodiments of the present disclosure, when the first intra prediction mode and the second intra prediction mode do not satisfy the above weighted blending condition for the current block, i.e., do not satisfy cost2<a1*cost1, or in other words, the second cost corresponding to the second intra prediction mode is greater than or equal to the product of the first cost corresponding to the first intra prediction mode and the modified first threshold coefficient, then the video decoder does not perform weighted prediction on the current block but performs prediction by using an intra prediction mode with the lowest cost in the first intra prediction mode and the second intra prediction mode. As can be seen from above, since the first cost is less than the second cost, the video decoder predicts the current block by directly using the first intra prediction mode and determines the obtained prediction value as the target prediction value of the current block.

In this first method, the video decoder decodes the bitstream to obtain the first flag. If the first flag indicates that the first technology is used, the video decoder modifies the value of the first threshold coefficient as the first preset value and determines the first blending condition according to the first cost corresponding to the first intra prediction mode, the second cost corresponding to the second intra prediction mode, and the modified first threshold coefficient. For example, the second cost being less than the product of the first cost and the modified first threshold coefficient is determined as the first blending condition, and then the first blending condition for the current block is determined as the weighted blending condition for the current block. In this first method, since the first threshold coefficient is modified to be smaller, the weighted blending condition for the current block becomes much stricter, so that the probability that the first intra prediction mode and the second intra prediction mode satisfy the modified weighted blending condition in the present disclosure can be reduced, and thus the probability of weighted prediction on the current block of the first image content can be reduced, thereby ensuring prediction quality of the current block of the first image content.

In some embodiments, the video decoder may also determine the first blending condition for the current block in a second method below.

Second method: the first blending condition for the current block is determined according to a first cost corresponding to the first intra prediction mode and a second cost corresponding to the second intra prediction mode.

In this second method, the first blending condition for the current block is directly determined according to the first cost and the second cost, which can simplify the process of determining the first blending condition for the current block, improve the speed of determining based on the first blending condition whether to perform weighted prediction on the current block, and thus improve the decoding efficiency.

The present disclosure does not limit a manner for determining the first blending condition for the current block according to the first cost and the second cost.

In an example, the first cost corresponding to the first intra prediction mode and the second cost corresponding to the second intra prediction mode being both greater than a certain preset value is determined as the first blending condition for the current block. For example, the first blending condition is cost1&cost2>b. That is, in embodiments of the present disclosure, when the first cost and the second cost are both greater than a certain preset value, it indicates that prediction effects of both the first intra prediction mode and the second intra prediction mode are poor. In this case, in order to improve the prediction effect of the current block, weighted prediction may be performed based on the first intra prediction mode and the second intra prediction mode, that is, the target prediction value of the current block is determined by weighting the prediction values that are obtained by using the first intra prediction mode and the second intra prediction mode respectively, so as to improve the prediction effect of the current block.

In an example, at least one of the first cost or the second cost being greater than or equal to a first preset threshold is determined as the first blending condition for the current block. For example, the first blending condition for the current block is that at least one of the first cost or the second cost is greater than or equal to the first preset threshold. The present disclosure does not limit a specific value of the first preset threshold, which can be determined according to actual needs. In this example, if the first cost corresponding to the first intra prediction mode and/or the second cost corresponding to the second intra prediction mode are greater than or equal to the first preset value, it indicates that the prediction efficiency of the first intra prediction mode and/or the second intra prediction mode is poor. In this case, in order to improve the prediction effect of the current block, weighted prediction may be performed based on the first intra prediction mode and the second intra prediction mode, that is, the target prediction value of the current block is determined by weighting the prediction values that are obtained by using the first intra prediction mode and the second intra prediction mode respectively, so as to improve the prediction effect of the current block.

In this second method, assuming that the first blending condition for the current block is that at least one of the first cost or the second cost is greater than or equal to the first preset threshold, then for determining the target prediction value of the current block according to the weighted blending condition and at least one of the first intra prediction mode or the second intra prediction mode, the operations at S403 include operations at S403-B1 below.

At S403-B1, when at least one of the first cost or the second cost is greater than or equal to the first preset threshold, the target prediction value of the current block is determined by using the first intra prediction mode and the second intra prediction mode.

That is to say, when at least one of the first cost or the second cost is greater than or equal to the first preset threshold, it indicates that the prediction effect of the first intra prediction mode and/or the second intra prediction mode for the current block is poor. In this case, if only a prediction mode with the lowest cost is used for prediction, the prediction may be inaccurate because the prediction efficiency of the prediction mode with the lowest cost cannot be ensured. In order to improve the prediction effect of the current block, when the video decoder determines that at least one of the first cost or the second cost is greater than or equal to the first preset threshold, the video decoder determines the target prediction value of the current block by using the first intra prediction mode and the second intra prediction mode. For example, the video decoder predicts the current block by using the first intra prediction mode to obtain a first prediction value, predicts the current block by using the second intra prediction mode to obtain a second prediction value, and obtains the target prediction value of the current block by weighting the first prediction value and the second prediction value. For example, according to the weighting method illustrated in the formula (1) to the formula (3) above, a weighting operation is performed to obtain the target prediction value of the current block. Alternatively, weights of the first prediction value and the second prediction value are derived by using a weight matrix, and then the target prediction value of the current block is obtained by weighting according to the formula (3). For example, the video decoder selects one of the 64 weight-partition modes of GPM or one of the 56 weight-partition modes of AWP, and uses the weight distribution corresponding to the selected mode to determine weights of the first prediction value corresponding to the first intra prediction mode and the second prediction value corresponding to the second intra prediction mode. For example, if the first intra prediction mode is an angular prediction mode, weight distribution corresponding to a weight-partition mode with an angle that coincides or approximately coincides with an angle of the first intra prediction mode is used to determine weights corresponding to the first prediction value and the second prediction value.

In some embodiments, the operations at S403 further include operations at S403-B2 below.

At S403-B2, when the first cost and the second cost are both less than the first preset threshold, the target prediction value of the current block is determined by using the first intra prediction mode.

In embodiments of the present disclosure, when the first intra prediction mode and the second intra prediction mode do not satisfy the above weighted blending conditions for the current block, i.e., when the first cost corresponding to the first intra prediction mode and the second cost corresponding to the second intra prediction mode are both less than the first preset value, it indicates that prediction effects of the first intra prediction mode and the second intra prediction mode for the current block are relatively good. In this case, when the current block is predicted by using one intra prediction mode, a better prediction effect can be achieved. If a weighted prediction method is used, i.e., if weighted prediction is performed on the current block by using the first intra prediction mode and the second intra prediction mode, the prediction effect of the current block may be reduced instead, for example, sharpness and colour vividness of the current block may be reduced. Therefore, in this case, in order to ensure the prediction quality of the current block, when the first cost and the second cost are both less than the first preset threshold, the video decoder uses an intra prediction mode with the lowest cost in the first intra prediction mode and the second intra prediction mode for prediction. As can be seen from above, since the first cost is less than the second cost, the video decoder predicts the current block by directly using the first intra prediction mode, and determines the obtained prediction value as the target prediction value of the current block.

In this second method, the video decoder decodes the bitstream to obtain the first flag. If the first flag indicates that the first technology is used, the video decoder determines the first blending condition according to the first cost corresponding to the first intra prediction mode and the second cost corresponding to the second intra prediction mode. For example, at least one of the first cost or the second cost being greater than or equal to the first preset threshold is determined as the first blending condition, and then the first blending condition for the current block is determined as the weighted blending condition for the current block. In this second method, if at least one of the first cost or the second cost is greater than or equal to the first preset threshold, it indicates that the prediction effect of the first intra prediction mode and/or the second intra prediction mode for the current block is poor. In order to improve the prediction effect of the current block, the video decoder determines the target prediction value of the current block by using the first intra prediction mode and the second intra prediction mode. If the first cost and the second cost are both less than the first preset threshold, it indicates that prediction effects of the first intra prediction mode and the second intra prediction mode for the current block are relatively good. In this case, in order to ensure the prediction effect of the current block and reduce the prediction complexity, the target prediction value of the current block is determined by using the first intra prediction mode.

It may be noted that the second method may be used to determine weighted blending conditions for other picture blocks in addition to the weighted blending condition for the current block whose image content is the first image content. That is to say, the above second method can be used to determine a first new weighted blending condition for determining whether weighted blending prediction is needed for a picture block.

In some embodiments, the video decoder may further determine the first blending condition for the current block in a third method below.

Third method: the first blending condition is determined according to the first intra prediction mode and the second intra prediction mode.

In this third method, the first blending condition for the current block is directly determined according to the first intra prediction mode and the second intra prediction mode, which can simplify the process of determining the first blending condition for the current block, improve the speed of determining based on the first blending condition whether to perform weighted prediction on the current block, and thus improve the decoding efficiency.

The present disclosure does not limit a manner for determining the first blending condition for the current block according to the first intra prediction mode and the second intra prediction mode.

In an example, a difference between an index number of the first intra prediction mode and an index number of the second intra prediction mode being greater than a certain preset value is determined as the first blending condition for the current block. For example, the first blending condition is mode1_idx & mode2_idx>c, where mode1_idx is the index number of the first intra prediction mode and mode2_idx is the index number of the second intra prediction mode. In the intra prediction modes such as the angular prediction modes illustrated in FIG. 5 or FIG. 6, neighbouring angular prediction modes correspond to approximate prediction effects. For example, an angular prediction mode with an index number 17 and an angular prediction mode with an index number 18 are both close to the horizontal direction, and the prediction effects thereof are approximate. As can be seen, when the difference between the index number of the first intra prediction mode and the index number of the second intra prediction mode is greater than a certain preset value, it indicates that the first intra prediction mode and the second intra prediction mode are two prediction modes with large difference and the corresponding prediction effects are quite different. In this case, in order to improve the prediction effect of the current block, weighted prediction may be performed based on the first intra prediction mode and the second intra prediction mode, that is, the target prediction value of the current block is determined by weighting the prediction values that are obtained by using the first intra prediction mode and the second intra prediction mode respectively, so as to improve the prediction effect of the current block.

In an example, the difference between the index number of the first intra prediction mode and the index number of the second intra prediction mode being greater than or equal to a second preset threshold is determined as the first blending condition for the current block. For example, the first blending condition for the current block is mode1_idx & mode2_idx>d, where d is the second preset threshold. The present disclosure does not limit a specific value of the second preset threshold, which can be determined according to actual needs, for example, the second preset threshold is 3 or 4, etc. When the difference between the index number of the first intra prediction mode and the index number of the second intra prediction mode is greater than or equal to the second preset threshold, it indicates that the difference between the first intra prediction mode and the second intra prediction mode is relatively large and the corresponding prediction effects are quite different. In this case, in order to improve the prediction effect of the current block, weighted prediction may be performed based on the first intra prediction mode and the second intra prediction mode, that is, the target prediction value of the current block is determined by weighting the prediction values that are obtained by using the first intra prediction mode and the second intra prediction mode respectively, so as to improve the prediction effect of the current block.

In this third method, assuming that the first blending condition for the current block is that the difference between the index number of the first intra prediction mode and the index number of the second intra prediction mode is greater than or equal to the second preset threshold, then for determining the target prediction value of the current block according to the weighted blending condition and at least one of the first intra prediction mode or the second intra prediction mode, the operations at S403 includes operations at S403-C1 below.

At S403-C1, when the difference between the index number of the first intra prediction mode and the index number of the second intra prediction mode is greater than or equal to the second preset threshold, the target prediction value of the current block is determined by using the first intra prediction mode and the second intra prediction mode.

That is to say, when the difference between the index number of the first intra prediction mode and the index number of the second intra prediction mode is greater than or equal to the second preset threshold, it indicates that the difference between the first intra prediction mode and the second intra prediction mode is relatively large and the corresponding prediction effects are quite different. In this case, if only a prediction mode with the lowest cost is used for prediction, the prediction may be inaccurate. In order to improve the prediction effect of the current block, when the video decoder determines that the difference between the index number of the first intra prediction mode and the index number of the second intra prediction mode is greater than or equal to the second preset threshold, the video decoder determines the target prediction value of the current block by using the first intra prediction mode and the second intra prediction mode. For example, the video decoder predicts the current block by using the first intra prediction mode to obtain a first prediction value, predicts the current block by using the second intra prediction mode to obtain a second prediction value, and obtains the target prediction value of the current block by weighting the first prediction value and the second prediction value. For example, according to the weighting method illustrated in the formula (1) to the formula (3) above, a weighting operation is performed to obtain the target prediction value of the current block. Alternatively, weights of the first prediction value and the second prediction value are derived by using a weight matrix, and then the target prediction value of the current block is obtained by weighting according to the formula (3). For example, the video decoder selects one of the 64 weight-partition modes of GPM or one of the 56 weight-partition modes of AWP, and uses the weight distribution corresponding to the selected mode to determine weights of the first prediction value corresponding to the first intra prediction mode and the second prediction value corresponding to the second intra prediction mode. For example, if the first intra prediction mode is an angular prediction mode, weight distribution corresponding to a weight-partition mode with an angle that coincides or approximately coincides with an angle of the first intra prediction mode is used to determine weights corresponding to the first prediction value and the second prediction value.

In some embodiments, the operations at S403 further include operations at S403-C2 below.

At S403-C2, when the difference between the index number of the first intra prediction mode and the index number of the second intra prediction mode is less than the second preset threshold, the target prediction value of the current block is determined by using the first intra prediction mode.

In embodiments of the present disclosure, when the first intra prediction mode and the second intra prediction mode do not satisfy the above weighted blending condition for the current block, i.e., when the difference between the index number of the first intra prediction mode and the index number of the second intra prediction mode is less than the second preset threshold, it indicates that prediction effects of the first intra prediction mode and the second intra prediction mode for the current block are approximate. In this case, when the current block is predicted by using one intra prediction mode, a better prediction effect can be achieved. If a weighted prediction method is used, i.e., if weighted prediction is performed on the current block by using the first intra prediction mode and the second intra prediction mode, the prediction effect of the current block may be reduced instead, for example, sharpness and colour vividness of the current block may be reduced and prediction complexity may be increased. Therefore, in this case, in order to ensure the prediction quality of the current block and reduce the prediction complexity, when the difference between the index number of the first intra prediction mode and the index number of the second intra prediction mode is less than the second preset threshold, the video decoder uses an intra prediction mode with the lowest cost in the first intra prediction mode and the second intra prediction mode for prediction. As can be seen from above, since the first cost is less than the second cost, the video decoder predicts the current block by directly using the first intra prediction mode, and determines the obtained prediction value as the target prediction value of the current block.

In this third method, the video decoder decodes the bitstream to obtain the first flag. If the first flag indicates that the first technology is used, the video decoder determines the first blending condition according to the first intra prediction mode and the second intra prediction mode. For example, the difference between the index number of the first intra prediction mode and the index number of the second intra prediction mode being greater than or equal to the second preset threshold is determined as the first blending condition, and then the first blending condition for the current block is determined as the weighted blending condition for the current block. In this third method, if the difference between the index number of the first intra prediction mode and the index number of the second intra prediction mode is greater than or equal to the second preset threshold, it indicates that the difference between the first intra prediction mode and the second intra prediction mode is relatively large and the corresponding prediction effects are quite different. In this case, in order to improve the prediction effect of the current block, the target prediction value of the current block is determined by weighting the prediction values that are obtained by using the first intra prediction mode and the second intra prediction mode respectively, so as to improve the prediction effect of the current block. If the difference between the index number of the first intra prediction mode and the index number of the second intra prediction mode is less than the second preset threshold, it indicates that prediction effects of the first intra prediction mode and the second intra prediction mode for the current block are approximate. In this case, in order to ensure the prediction effect of the current block and reduce the prediction complexity, the target prediction value of the current block is determined by using the first intra prediction mode.

It may be noted that the third method may be used to determine weighted blending conditions for other picture blocks in addition to the weighted blending condition for the current block whose image content is the first image content. That is to say, the above third method can be used to determine a first new weighted blending condition for determining whether weighted blending prediction is needed for a picture block.

In embodiments of the present disclosure, if the first flag indicates that the first technology is used, the video decoder determines the first blending condition for the current block in any one of the above three methods, and determines the first blending condition as the weighted blending condition for the current block to determine whether to perform weighted prediction on the current block. Therefore, the probability of weighted prediction on the current block can be reduced while the prediction effect of the current block is ensured, further improving the prediction quality of the current block.

In some embodiments, before the operations at S402 are executed, the types of the first intra prediction mode and the second intra prediction mode need to be determined first. The operations at S402, that is, the weighted blending condition for the current block is determined according to the image content of the current sequence, are executed only when at least one of the first intra prediction mode or the second intra prediction mode is an angular prediction mode.

In some embodiments, when each of the first intra prediction mode and the second intra prediction mode is a non-angular prediction mode, the operations at S402 are skipped and the target prediction value of the current block is directly determined according to the first intra prediction mode.

In some embodiments, whether to use the method of embodiments of the present disclosure is limited by a type of a current frame where the current block is located. In other words, whether to execute the operation of determining the weighted blending condition for the current block according to the image content of the current sequence at S402 is determined according to the type of the current frame. It is specified in this embodiment that the method of embodiments of the present disclosure can be used for some types of frames and cannot be used for other types of frames, so that differentiated execution can be realized. For example, when the type of the current frame is a target frame-type, the weighted blending condition for the current block is determined according to the image content of the current sequence. For example, the technical solution of the present disclosure is allowed for an I frame and is not allowed for a B frame. The present disclosure does not limit the target frame-type, which can be determined according to actual needs. Optionally, the target frame-type includes at least one of an I frame, a P frame, or a B frame.

In some embodiments, whether to use the method of embodiments of the present disclosure is limited by the type of a frame and the size of a picture block. In this case, before executing the method of embodiments of the present disclosure, the video decoder first determines the type of the current frame where the current block is located and the size of the current block, and then determines according to the type of the current frame and the size of the current block whether to determine the weighted blending condition for the current block according to the image content of the current sequence.

It may be noted that in embodiments of the present disclosure, the size of the current block may include a height and a width of the current block. Therefore, the video decoder determines according to the height and the width of the current block whether to execute the operations at S402.

Exemplarily, in the present disclosure, when the type of the current frame is a first frame-type and the size of the current block is greater than a first threshold, the weighted blending condition for the current block is determined according to the image content of the current sequence.

Exemplarily, in the present disclosure, when the type of the current frame is a second frame-type and the size of the current block is greater than a second threshold, the weighted blending condition for the current block is determined according to the image content of the current sequence. Optionally, the first frame-type is different from the second frame-type. Optionally, the first threshold is also different from the second threshold. The present disclosure does not limit specific types of the first frame-type and the second frame-type, and does not limit specific values of the first threshold and the second threshold. In a specific example, if the first frame-type is the I frame and the second frame-type is the B frame or the P frame, the second threshold is different from the first threshold, that is, applicable block sizes specified for the I frame and the B frame (or the P frame) may be different.

In some embodiments, whether to use the method of embodiments of the present disclosure may be further limited by a quantization parameter. In this case, before executing the method of embodiments of the present disclosure, the video decoder first decodes the bitstream to obtain a quantization parameter corresponding to the current block. For example, the video decoder obtains the quantization parameter of the current block according to a frame-level allowed flag or a sequence-level QP allowed flag. Then, the video decoder determines according to the quantization parameter whether to determine the weighted blending condition for the current block according to the image content of the current sequence.

Exemplarily, when the quantization parameter is less than a third threshold, the weighted blending condition for the current block is determined according to the image content of the current sequence. The present disclosure does not limit a specific value of the third threshold, which can be determined according to actual needs.

After the video decoder obtains the prediction value of the current block according to the above method, the video decoder decodes the bitstream to obtain a residual value of the current block, and adds a prediction block and a residual block to obtain a reconstructed block of the current block.

In the intra prediction method of embodiments of the present disclosure, the video decoder decodes the bitstream to determine the first intra prediction mode and the second intra prediction mode for the current block. Next, the video decoder determines the weighted blending condition for the current block according to the image content of the current sequence, where the weighted blending condition is used to determine whether weighted prediction is performed on the current block based on the first intra prediction mode and the second intra prediction mode. Then, the video decoder determines the target prediction value of the current block according to the weighted blending condition and at least one of the first intra prediction mode or the second intra prediction mode. That is, in the present disclosure, the weighted blending condition for the current block is determined according to the image content of the current sequence, and whether weighted blending prediction is performed on the current block is determined based on the weighted blending condition. In this way, weighted blending prediction will not be performed on the image content that does not require weighted blending prediction, so that prediction quality will not be reduced and unnecessary noise can be avoided, thereby improving accuracy of intra prediction.

In some embodiments, the present disclosure proposes a new method for determining a weighted blending condition. Specifically, a value of a first threshold coefficient is determined as a second preset value, where the first threshold coefficient is used to determine the weighted blending condition. Then the first blending condition for the current block is determined according to a first cost corresponding to the first intra prediction mode, a second cost corresponding to the second intra prediction mode, and the first threshold coefficient.

Optionally, the first preset value is a positive number less than 2, for example, 1.9 or 1.95, etc.

Optionally, the weighted blending condition is that the second cost is less than a product of the first cost and the first threshold coefficient.

In this example, it is assumed that the existing weighted blending condition is cost2<a*cost1 and the weighted blending condition in the present disclosure is cost2<a2*cost1, where a2 is less than a. Therefore, the weighted blending condition in the present disclosure is much stricter. For example, when cost2 satisfies the existing weighted blending condition, the value of cost2 is in the range of cost1<cost2<a*cost1, and when cost2 satisfies the weighted blending condition in the present disclosure, the value of cost2 in the range of cost1<cost2<a2*cost1. Since a2 is less than a, the value of cost2 will be in the smaller range to make cost2 satisfy the modified weighted blending condition, so that it is difficult for the first intra prediction mode and the second intra prediction mode to satisfy the modified weighted blending condition in the present disclosure. Therefore, when the modified weighted blending condition is used to determine whether to perform weighted prediction, the probability of weighted prediction on the current block of the first image content can be reduced, thereby ensuring prediction quality of the current block of the first image content.

After the video decoder determines the weighted blending condition for the current block according to the above method, the video decoder determines whether the first intra prediction mode and the second intra prediction mode satisfy the weighted blending condition. Exemplarily, if the second cost is less than the product of the first cost and the first threshold coefficient, the target prediction value of the current block is determined by using the first intra prediction mode and the second intra prediction mode. Exemplarily, if the second cost is greater than or equal to the product of the first cost and the first threshold coefficient, the target prediction value of the current block is determined by using the first intra prediction mode.

It may be noted that the above method for determining the weighted blending condition for the current block is applicable to the current block of any image content.

A decoding process in which the intra prediction method provided in the present disclosure is combined with the TIMD technology will be introduced below.

Figure 9:
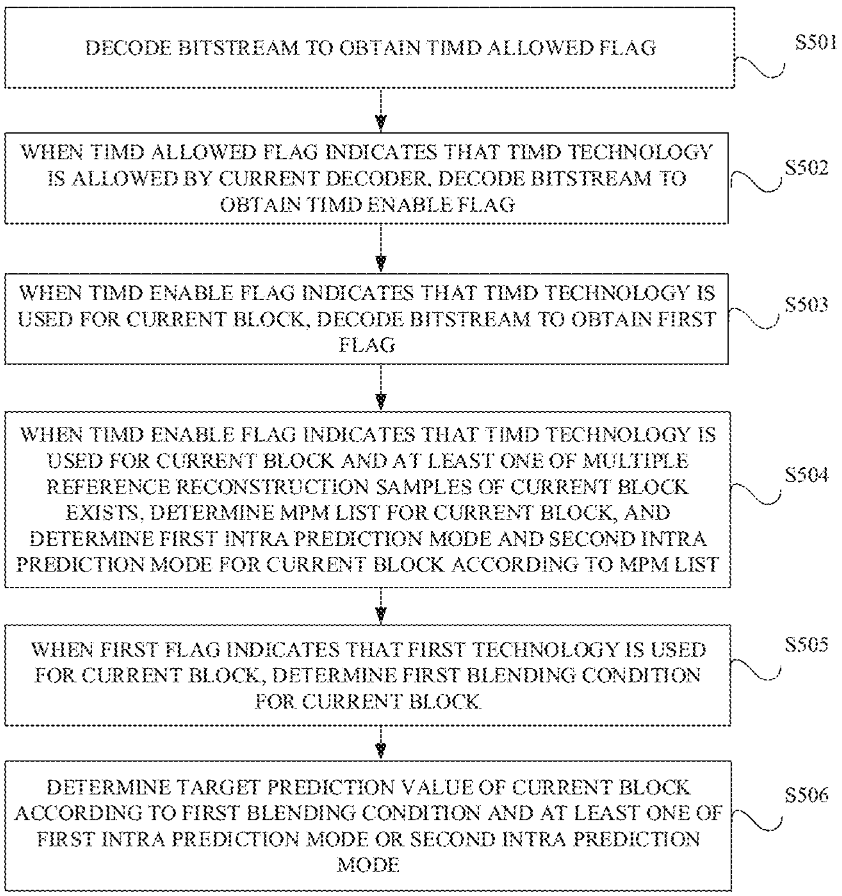
FIG. 9 is a schematic flowchart of an intra prediction method provided in embodiments of the present disclosure.

FIG. 9 is a schematic flowchart of an intra prediction method provided in embodiments of the present disclosure. As illustrated in FIG. 9, the intra prediction method includes the following.

At S501, the bitstream is decoded to obtain a TIMD allowed flag.

The TIMD allowed flag indicates whether a TIMD technology is allowed by a current decoder.

At S502, when the TIMD allowed flag indicates that the TIMD technology is allowed by the current decoder, the bitstream is decoded to obtain a TIMD enable flag.

The TIMD enable flag indicates whether the TIMD technology is used for the current block.

At S503, when the TIMD enable flag indicates that the TIMD technology is used for the current block, the bitstream is decoded to obtain a first flag.

The first flag indicates whether a first technology is used, and the first technology is used for a first image content.

At S504, when the TIMD enable flag indicates that the TIMD technology is used for the current block and at least one of multiple reference reconstruction samples of the current block exists, an MPM list for the current block is determined, and the first intra prediction mode and the second intra prediction mode for the current block are determined according to the MPM list.

For specific details, reference can be made to the description of S401 above, which is not repeated herein.

At S505, when the first flag indicates that the first technology is used for the current block, a first blending condition for the current block is determined.

For example, a value of a first threshold coefficient is modified as a first preset value, and the first blending condition is determined according to a first cost corresponding to the first intra prediction mode, a second cost corresponding to the second intra prediction mode, and the modified first threshold coefficient.

For example, the first blending condition for the current block is determined according to the first cost corresponding to the first intra prediction mode and the second cost corresponding to the second intra prediction mode.

For example, the first blending condition is determined according to the first intra prediction mode and the second intra prediction mode.

For specific details, reference can be made to the description of S402 above, which is not repeated herein.

At S506, a target prediction value of the current block is determined according to the first blending condition and at least one of the first intra prediction mode or the second intra prediction mode.

For specific details, reference can be made to the description of S403 above, which is not repeated herein.

After the video decoder obtains the target prediction value of the current block according to the above method, the video decoder decodes the bitstream to obtain a residual value of the current block, and adds a prediction block and a residual block to obtain a reconstructed block of the current block.

In embodiments of the present disclosure, the weighted blending condition in the TIMD technology is adjusted, for example, the weighted blending condition for the current block is determined according to the image content of the current sequence, and whether to perform weighted blending prediction on the current block is determined based on the weighted blending condition. In this way, weighted blending prediction will not be performed on the image content that does not require weighted blending prediction, so that prediction quality will not be reduced and unnecessary noise can be avoided, thereby improving accuracy of intra prediction.

Further, after the method of embodiments of the present disclosure is integrated into the latest ECM 2.0, tests are conducted under the common test condition and All Intra (AI) prediction condition, and test results are illustrated in Table 3.

TABLE 3

| | All intra prediction (All Intra Main10) Over ECM2.0 | | | | |
|---|---|---|---|---|---|
| | Y | U | V | EncT | DecT |
| Class A1 | 0.00% | 0.00% | 0.00% | 100% | 100% |
| Class A2 | 0.00% | 0.00% | 0.00% | 100% | 100% |
| Class B | 0.00% | 0.00% | 0.00% | 100% | 100% |
| Class C | 0.00% | 0.00% | 0.00% | 100% | 100% |
| Class E | 0.00% | 0.00% | 0.00% | 100% | 100% |
| Overall | 0.00% | 0.00% | 0.00% | 100% | 100% |
| Class D | 0.00% | 0.00% | 0.00% | 100% | 100% |
| Class F | −0.08% | −0.13% | −0.20% | 100% | 100% |

Notably, since only the class F sequence in the existing common test conditions for the ECM software of JVET is a screen content coding sequence, a sequence-level switch (for example, the above first flag) is used in the tests, to allow the method to be used only in the case of screen content coding. Therefore, only class F has fluctuations in performance.

As can be seen from the tests in Table 3, the present disclosure achieves improvement in decoding performance under the All Intra condition, and the improvement is relatively stable, with an average of 0.08% improvement in decoding performance. In addition, this disclosure has almost no influence on the complexity of hardware and software, and it can be seen from the decoding time for the reference software that there is no fluctuation in program runtime.

The decoding method in embodiments of the present disclosure is introduced above. On this basis, an encoding method provided in embodiments of the present disclosure is introduced below.

Figure 10:
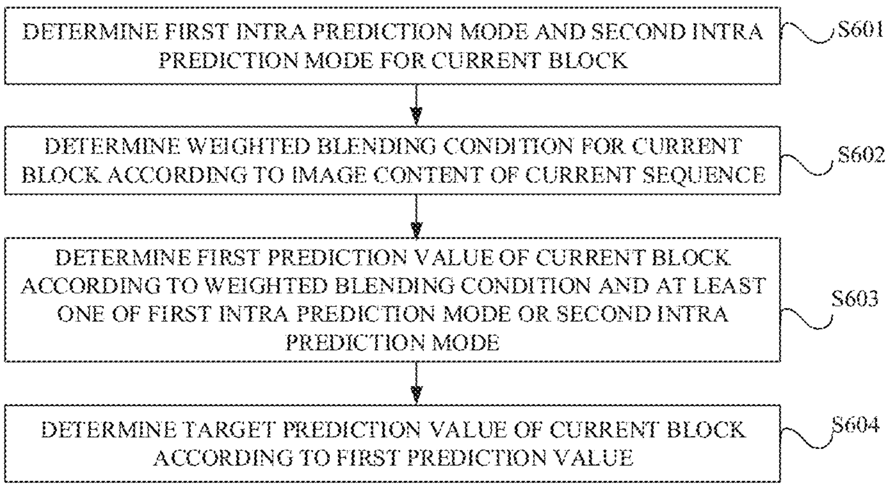
FIG. 10 is a schematic flowchart of an intra prediction method provided in embodiments of the present disclosure.

FIG. 10 is a schematic flowchart of an intra prediction method provided in embodiments of the present disclosure. As illustrated in FIG. 10, the method of embodiments of the present disclosure includes the following.

At S601, a first intra prediction mode and a second intra prediction mode for a current block are determined.

During video encoding, the video encoder receives a video stream that consists of a series of pictures. Video encoding is performed on each picture in the video stream. The video encoder divides the picture into blocks to obtain the current block.

In some embodiments, the current block may also be referred to as a current coding block, a current picture block, a coding block, a current coding unit, a current block to be coded, a current picture block to be coded, etc.

For a traditional division manner, a block after division includes both the chroma component and the luma component at a location of the current block. In comparison, for a dual tree technology, a block of a separate component can be obtained, such as a separate luma block and a separate chroma block. It can be understood that the luma block includes only the luma component at the location of the current block, and the chroma block includes only the chroma component at the location of the current block. As such, the luma component and the chroma component at the same location may belong to different blocks, which enables better flexibility of division. If the dual tree technology is used for CU division, some CUs may include both the luma component and the chroma component, some CUs may include only the luma component, and some CUs may include only the chroma component.

In some embodiments, the current block in embodiments of the present disclosure only includes the chroma component, and the current block can be understood as the chroma block.

In some embodiments, the current block in embodiments of the present disclosure only includes the luma component, and the current block can be understood as the luma block.

In some embodiments, the current block includes both the luma component and the chroma component.

It may be noted that, when the video encoder determines that weighted blending prediction with two intra prediction modes is allowed for the current block, the video encoder determines the first intra prediction mode and the second intra prediction mode. When the video encoder determines that the first intra prediction mode and the second intra prediction mode satisfy a weighted blending condition, the video encoder predicts the current block by using the first intra prediction mode to obtain a first prediction value of the current block, predicts the current block by using the second intra prediction mode to obtain a second prediction value of the current block, and obtains an intermediate prediction value of the current block by performing weighted blending on the first prediction value and the second prediction value.

In some embodiments, when the video encoder determines that the first intra prediction mode and the second intra prediction mode do not satisfy the weighted blending condition, the video encoder predicts the current block by using one of the first intra prediction mode or the second intra prediction mode to obtain the intermediate prediction value of the current block.

In some embodiments, when the video encoder determines that weighted blending prediction with two intra prediction modes is allowed for the current block, a second flag is signalled into a bitstream by the video encoder, where the second flag indicates whether the intermediate prediction value of the current block is determined according to at least one of the first intra prediction mode or the second intra prediction mode. If the video encoder determines the intermediate prediction value according to at least one of the first intra prediction mode or the second intra prediction mode, then the second flag is set as true, for example, a value of the second flag is set as 1. Then the second flag that is set as true is signalled into the bitstream, for example, signalled into a header of the bitstream. In this way, after obtaining the bitstream, the video decoder decodes the bitstream to obtain the second flag. If the second flag is true, for example, the value of the second flag is 1, then the video decoder determines that the intermediate prediction value of the current block is determined according to at least one of the first intra prediction mode or the second intra prediction mode. Optionally, a manner in which the video encoder determines the first intra prediction mode and the second intra prediction mode is the same as a manner in which the video decoder determines the first intra prediction mode and the second intra prediction mode. Reference can be made to the description of S401 above.

If the video encoder does not determine the intermediate prediction value of the current block according to at least one of the first intra prediction mode or the second intra prediction mode, then the second flag is set as false, for example, the value of the second flag is set as 0. Then the second flag that is set as false is signalled into the bitstream, for example, signalled into the header of the bitstream. The video decoder decodes the bitstream to obtain the second flag. If the second flag is false, for example, the value of the second flag is 0, the video decoder does not determine the first intra prediction mode and the second intra prediction mode for the current block. Instead, the decoder determines, by traversing preset intra prediction modes, an intra prediction mode with a lowest cost to predict the current block, so as to obtain the intermediate prediction value of the current block.

In a possible implementation, if the TIMD technology is used in the present disclosure, the second flag may be a TIMD enable flag, such as sps_timd_enable_flag. That is to say, the video encoder obtains a TIMD allowed flag, where the TIMD allowed flag is a sequence-level flag. The TIMD allowed flag indicates whether the TIMD technology is allowed for a current sequence. If the video encoder determines that the TIMD technology is allowed for the current sequence, the TIMD allowed flag is true, for example, equal to 1. Then, the video encoder determines the first intra prediction mode and the second intra prediction mode for the current block, and performs the method of embodiments of the present disclosure. If the video encoder uses the TIMD technology to determine the intermediate prediction value of the current block, then the TIMD enable flag is set as true, for example, set as 1, and the TIMD enable flag is signalled into the bitstream, for example, signalled into the header of the bitstream. If the video encoder does not use the TIMD technology to determine the intermediate prediction value of the current block, the TIMD enable flag is set as false, for example, set as 0, and the TIMD enable flag is signalled into the bitstream, for example, signalled into the header of the bitstream. In this way, the video decoder can parse out the TIMD enable flag from the bitstream, and determine according to the TIMD enable flag whether the TIMD technology is used to determine the intermediate prediction value of the current block. Therefore, consistency between the decoding end and the encoding end can be ensured, and further reliability of prediction can be ensured.

In the present disclosure, manners for determining the first intra prediction mode and the second intra prediction mode for the current block at S601 include but are not limited to the following.

Manner I, a preset intra prediction list is traversed, from which an intra prediction mode with a lowest cost is selected as the first intra prediction mode and an intra prediction mode with a second lowest cost is selected as the second intra prediction mode.

The preset intra prediction list may include any one intra coding mode such as a DC mode, a Planar mode, and an angular mode.

In Manner I, the video encoder performs predictive coding on the current block by using each of different intra prediction modes in the preset intra prediction list, and then calculates a cost corresponding to each of the multiple prediction modes. The video encoder then determines an intra prediction mode corresponding to a lowest cost as the first intra prediction mode for the current block, and determines an intra prediction mode corresponding to a second lowest cost as the second intra prediction mode for the current block.

Optionally, SAD or SATD, etc. is used as an approximate cost of each prediction mode. Optionally, the SAD and the SATD may be determined according to the current block and the prediction values of the current block. For example, the current block is predicted by using a certain intra prediction mode to obtain the prediction value of the current block, and sample differences between the current block and the prediction values of the current block are used to determine the SAD corresponding to that intra prediction mode. Differences between the current block and the prediction values of the current block are calculated to obtain residual values of the current block, Hadamard transform is performed on the residual values, and then the sum of absolute values of elements is calculated, so that the SATD corresponding to that intra prediction mode can be obtained.

Manner II, the first intra prediction mode and the second intra prediction mode for the current block are determined according to MPMs for the current block. That is, the operations at S601 include operations at S601-A1 and S601-A2 below.

At S601-A1, MPMs for the current block are determined.

At S601-A2, the first intra prediction mode and the second intra prediction mode are determined according to the MPMs.

In intra prediction, an MPM list-based intra mode coding technology can be used to improve coding efficiency. The MPM list is constructed with intra prediction modes for surrounding coded blocks, intra prediction modes that are derived from the intra prediction modes for the surrounding coded blocks, such as adjacent modes, and some commonly-used or high-probability intra prediction modes, such as DC, Planar, and Bilinear modes. Reference to the intra prediction modes for the surrounding coded blocks utilizes spatial correlation.

As can be seen from above, the MPM list is formed according to intra prediction modes for encoded regions around the current block. In this way, the video encoder obtains the intra prediction modes used for picture blocks in the encoded regions around the current block, so as to form the MPM list for the current block. For example, the MPM list for the current block is constructed with intra prediction modes for a top region, a top-left region, a top-right region, etc. of the current block.

In some embodiments, if the TIMD technology is used in the present disclosure, then as illustrated in FIG. 7, the MPM list for the current block is constructed with intra prediction modes for encoded regions among a top-right region, a top region, a top-left region, a left region, and a bottom-left region of the current block. For example, intra prediction mode 1 was used for encoding the top-right region, intra prediction mode 2 was used for encoding the top region, intra prediction mode 3 was used for encoding the top-left region, intra prediction mode 2 was used for encoding the left region, and intra prediction mode 4 was used for encoding the bottom-left region. Therefore, it can be determined that the MPM list for the current block includes intra prediction mode 1, intra prediction mode 2, intra prediction mode 3, and intra prediction mode 4.

It may be noted that, if some regions among the top-right region, the top region, the top-left region, the left region, and the bottom-left region of the current block have not been encoded, the MPM list for the current block is constructed with the intra prediction modes corresponding to the encoded regions among these regions.

Optionally, if the current block is a block to be firstly encoded, that is, no encoded region exists around the current block, several intra prediction modes may be selected from multiple preset intra prediction modes to construct the MPM list for the current block.

Optionally, if the current block is a block to be firstly encoded, then the method described in Manner I is used, all intra prediction modes in the preset intra prediction list are traversed to obtain the first intra prediction mode with the lowest cost and the second intra prediction mode with the second lowest cost.

After the MPM list for the current block is determined according to the above method, the first intra prediction mode and the second intra prediction mode are determined according to the MPM list. For ease of illustration, an intra prediction mode in the MPM list is referred to as a candidate intra prediction mode. Manners for determining the first intra prediction mode and the second intra prediction mode according to the MPM list include but are not limited to the following examples.

Example 1, one candidate intra prediction mode in the above MPM list is determined as the first intra prediction mode, and one candidate intra prediction mode in the MPM list other than the first intra prediction mode is determined as the second intra prediction mode. For example, any one candidate intra prediction mode in the MPM list is determined as the first intra prediction mode, and any one candidate prediction mode in the MPM list other than the first intra prediction mode is determined as the second intra prediction mode.

Example 2, costs when predicting the current block using the candidate intra prediction modes respectively in the MPM list are determined, and the first intra prediction mode and the second intra prediction mode are determined according to the costs corresponding to the candidate intra prediction modes in the MPM list. For example, predictive coding is performed on the current block by using each of the candidate intra prediction modes in the MPM list, so as to obtain the cost corresponding to each of the candidate intra prediction modes. Next, the first intra prediction mode and the second intra prediction mode are determined according to the costs corresponding to the respective candidate intra prediction modes in the MPM list. For example, a candidate intra prediction mode with a lowest cost in the MPM list is determined as the first intra prediction mode, and a candidate intra prediction mode with a second lowest cost in the MPM list is determined as the second intra prediction mode.

Optionally, the above cost may be SAD or SATD, etc., which is not limited in the present disclosure.

In Manner II, the MPM list for the current block is determined, and the first intra prediction mode and the second intra prediction mode for the current block are determined according to the costs when performing predictive coding on the current block using the candidate intra prediction modes respectively in the MPM list. Since the MPM list includes fewer intra prediction modes, the complexity of determining the first intra prediction mode and the second intra prediction mode is reduced, and the speed of determining the first intra prediction mode and the second intra prediction mode is improved, thereby improving the prediction efficiency.

If the TIMD technology is used in the present disclosure, the first intra prediction mode and the second intra prediction mode for the current block are determined by using Manner III below.

Manner III, the first intra prediction mode and the second intra prediction mode for the current block are determined based on the TIMD technology. That is, the operations at S601 include operations at S601-B1 and S601-B2 below.

At S601-B1, a TIMD allowed flag is obtained, where the TIMD allowed flag indicates whether a TIMD technology is allowed for the current sequence.

At S601-B2, when the TIMD allowed flag indicates that the TIMD technology is allowed for the current sequence, the first intra prediction mode and the second intra prediction mode for the current block are determined.

As can be seen from above, the TIMD technology refers to deriving an intra prediction mode based on a template. Based on the TIMD technology, when the video encoder determines according to the TIMD allowed flag that the TIMD technology can be used for the current block, the first intra prediction mode and the second intra prediction mode for the current block may be determined by performing predictive coding on the template(s) of the current block illustrated in FIG. 7, instead of determining the first intra prediction mode and the second intra prediction mode by directly performing predictive coding on the current block. Since the template of the current block is a reconstructed region, the effect of the intra prediction mode may be determined according to differences between prediction values and reconstructed values of the template, so that the first intra prediction mode and the second intra prediction mode for the current block can be determined accurately and quickly.

Manners for determining the first intra prediction mode and the second intra prediction mode for the current block at S601-B2 include but are not limited to the following examples.

Example 1, the preset intra prediction mode list is traversed, and predictive coding is performed on the template of the current block by using each of the intra prediction modes in the intra prediction mode list to obtain a prediction value corresponding to each of the prediction modes. Next, the prediction value corresponding to each of the prediction modes is compared with the reconstructed value of the template. For example, a cost such as SAD or SATD between the prediction value corresponding to that prediction mode and the reconstructed value of the template is calculated. A prediction mode with a lowest cost is determined as the first intra prediction mode for the current block, and a prediction mode with a second lowest cost is determined as the second intra prediction mode for the current block.

Example 2, the first intra prediction mode and the second intra prediction mode for the current block are determined according to operations at S601-B21 and S601-B22 below.

At S601-B21, when the TIMD allowed flag indicates that the TIMD technology is allowed for the current sequence and at least one of multiple reference reconstruction samples of the current block exists, an MPM list for the current block is determined.

At S601-B22, the first intra prediction mode and the second intra prediction mode for the current block are determined according to the MPM list.

In Example 2, the multiple reference reconstruction samples of the current block can be understood as reconstructed regions around the current block, and in Example 2, the MPM list for the current block is determined according to intra prediction modes for the multiple residual reconstruction samples around the current block. The multiple reference reconstruction samples of the current block are predetermined, for example, a top reconstructed-region of the current block is determined as a reconstruction sample of the current block, and a left reconstructed-region of the current block is determined as a reconstruction sample of the current block, etc.

In some embodiments, as illustrated in FIG. 7, the top-right region, the top region, the top-left region, the left region, and the bottom-left region of the current block are referred to as the reference reconstruction samples of the current block. Some of these reference reconstruction samples exist, i.e., valid, and some of these reference reconstruction samples may not exist, i.e., invalid. For example, the left region of the current block has been reconstructed, and the top region of the current block has not been reconstructed, which means that the reference reconstruction sample of the left region of the current block exists (i.e., valid) and the reference reconstruction sample of the top region of the current block does not exist (i.e., invalid).

In Example 2, if the TIMD allowed flag indicates that the TIMD technology is allowed for the current sequence and at least one of the multiple reference reconstruction samples of the current block exists, the MPM list for the current block is constructed according to an intra prediction mode(s) corresponding to the reference reconstruction sample(s) that exists. For example, if K reference reconstruction samples of the current block exist and intra prediction modes used for intra prediction are respectively intra prediction mode 1, intra prediction mode 2, . . . , and intra prediction mode K, then the MPM list for the current block is constructed with intra prediction mode 1, intra prediction mode 2, . . . , and intra prediction mode K.

After the MPM list for the current block is determined according to the above operations, the first intra prediction mode and the second intra prediction mode for the current block are determined according to the MPM list.

For example, if the number of intra prediction modes in the MPM list is greater than 1, any one intra prediction mode in the MPM list is determined as the first intra prediction mode for the current block, and any one intra prediction mode in the MPM list other than the first intra prediction mode is determined as the second intra prediction mode for the current block.

In some embodiments, if the number of intra prediction modes in the MPM list is equal to 1, the intra prediction mode in the MPM list is determined as the first intra prediction mode, and one of other intra prediction modes is determined as the second intra prediction mode for the current block. For example, an intra prediction mode with the lowest cost among the other intra prediction modes is determined as the second intra prediction mode.

In some embodiments, if the number of intra prediction modes in the MPM list is equal to 1, the intra prediction mode in the MPM list is determined as the first intra prediction mode, and a Planar mode is determined as the second intra prediction mode.

In some embodiments, if the number of intra prediction modes in the MPM list is equal to 1, it is determined that weighted blending prediction is not performed on the current block, and the current block is predicted by using the intra prediction mode in the MPM list to obtain the intermediate prediction value of the current block.

In some embodiments, if the number of candidate intra prediction modes in the MPM list is greater than 1, costs when predicting the template region of the current block using the candidate intra prediction modes respectively in the MPM list are determined, and the first intra prediction mode and the second intra prediction mode are determined according to the costs corresponding to the candidate intra prediction modes in the MPM list. For example, a candidate intra prediction mode with a lowest cost in the MPM list is determined as the first intra prediction mode, and a candidate intra prediction mode with a second lowest cost in the MPM list is determined as the second intra prediction mode.

Optionally, the above cost may be rate-distortion optimization (RDO) cost, or may also be an approximate cost such SAD or SATD.

In an example, the above process of determining the costs when predicting the template region of the current block using the candidate intra prediction modes respectively in the MPM list may be as follows. For each of the candidate intra prediction modes in the MPM list, a prediction value of the template region of the current block is determined by using the candidate intra prediction mode, and a cost corresponding to the candidate intra prediction modes is determined according to the prediction value corresponding to the candidate intra prediction mode and the reconstructed value of the template region. Specifically, for a candidate intra prediction mode in the MPM list, a prediction value of the template region of the current block is obtained by using the candidate intra prediction mode, and the reconstructed value is known because the template region is a reconstructed region. Next, a cost corresponding to the candidate intra prediction mode is determined according to the prediction value corresponding to the intra prediction mode and the reconstructed value of the template region. For example, the SAD or SATD between the prediction value corresponding to the intra prediction mode and the reconstructed value of the template region is determined as the cost of the candidate intra prediction mode.

In some embodiments, if the TIMD allowed flag indicates that the TIMD technology is allowed for the current sequence and each of the multiple reference reconstruction samples of the current block does not exist, the video encoder does not determine the first intra prediction mode and the second intra prediction mode for the current block. Instead, the video encoder predicts the current block by using the Planar mode to obtain the intermediate prediction value of the current block.

According to any one of Manner I, Manner II, and Manner III, the first intra prediction mode and the second intra prediction mode for the current block can be determined.

In some embodiments, in Manner II and Manner III, the first intra prediction mode and the second intra prediction mode are determined according to the costs corresponding to the candidate intra prediction modes in the MPM list as follows.

Manner 1, a candidate intra prediction mode with a lowest cost in the MPM list is determined as the first intra prediction mode, and a candidate intra prediction mode with a second lowest cost in the MPM list is determined as the second intra prediction mode.

Manner 2, the candidate intra prediction mode with the lowest cost in the MPM list is determined as a first initial mode, and the candidate intra prediction mode with the second lowest cost in the MPM list is determined as a second initial mode. When at least one of the first initial mode or the second initial mode is an angular prediction mode, the angular prediction mode of the first initial mode and the second initial mode is offset according to a preset offset, so as to obtain the first intra prediction mode and the second intra prediction mode.

In some embodiments, if the first initial mode is the angular prediction mode, then taking the first initial mode as a central prediction direction, the first initial mode is offset to the left by a certain angle to obtain $mode1^+$ and is offset to the right by a certain angle to obtain $mode1^-$. Costs when predicting the template region of the current block using $mode1^+$ and $mode1^-$ respectively are determined, and a prediction mode with the lowest cost among $mode1^+$, $mode1^-$, and the first initial mode is determined as the first intra prediction mode.

In some embodiments, if the second initial mode is the angular prediction mode, then taking the second initial mode as the central prediction direction, the second initial mode is offset to the left by a certain angle to obtain $mode2^+$ and is offset to the right by a certain angle to obtain $mode2^-$. Costs when predicting the template region of the current block using $mode2^+$ and $mode2^-$ respectively are determined, and a prediction mode with the lowest cost among $mode2^+$, $mode2^-$, and the second initial mode is determined as the second intra prediction mode.

In some embodiments, if neither the first initial mode nor the second initial mode is the angular prediction mode, the first initial mode is determined as the first intra prediction mode, and the second initial mode is determined as the second intra prediction mode.

After the first intra prediction mode and the second intra prediction mode for the current block are determined according to the above method, operations at S602 and S603 are executed as follows.

At S602, a weighted blending condition for the current block is determined according to an image content of a current sequence.

The weighted blending condition is used to determine whether weighted prediction is performed on the current block based on the first intra prediction mode and the second intra prediction mode.

At S603, an intermediate prediction value of the current block is determined according to the weighted blending condition and at least one of the first intra prediction mode or the second intra prediction mode.

In embodiments of the present disclosure, after the video encoder obtains the first intra prediction mode and the second intra prediction mode for the current block according to the operations at S601, the video encoder does not perform weighted prediction on the current block by directly using the first intra prediction mode and the second intra prediction mode, but needs to determine whether the first intra prediction mode and the second intra prediction mode satisfy the weighted blending condition for the current block. If the first intra prediction mode and the second intra prediction mode satisfy the weighted blending condition for the current block, weighted prediction is performed on the current block by using the first intra prediction mode and the second intra prediction mode. For example, the current block is predicted by using the first intra prediction mode to obtain a first prediction value, the current block is predicted by using the second intra prediction mode to obtain a second prediction value, and the intermediate prediction value of the current block is obtained by weighting the first prediction value and the second prediction value. Weights for weighting the first prediction value and the second prediction value may be determined according to a cost of the first intra prediction mode and a cost of the second intra prediction mode. For example, the cost when predicting the current block using the first intra prediction mode is denoted as a first cost cost1, and the cost when predicting the current block using the second intra prediction mode is denoted as a second cost cost2, where the first cost and the second cost may be SAD or SATD, etc. weight1 is a weight corresponding to the first prediction value, and weight2 is a weight corresponding to the second prediction value. Optionally, weight1=cost2/(cost1+cost2), and weight2=1−weight1. In this way, the intermediate prediction value of the current block can be obtained by weighting the first prediction value and the second prediction value according to the above formula (3).

If the first intra prediction mode and the second intra prediction mode do not satisfy the weighted blending condition for the current block, the current block is predicted by using one of the first intra prediction mode or the second intra prediction mode to obtain the intermediate prediction value of the current block. For example, the current block is predicted by using a prediction mode with the lowest cost in the first intra prediction mode and the second intra prediction mode to obtain the intermediate prediction value of the current block. Optionally, as can be seen from description of S601, the first intra prediction mode is the intra prediction mode with the lowest cost among the multiple prediction modes, and the second intra prediction mode is the intra prediction mode with the second lowest cost among the multiple prediction modes, that is, the first cost is less than the second cost. Therefore, when the first intra prediction mode and the second intra prediction mode do not satisfy the weighted blending condition for the current block, the current block is predicted by using the first intra prediction mode to obtain the intermediate prediction value of the current block.

The current weighted blending condition is fixed, that is, the weighted blending condition for the current block does not change with the image content. However, some image contents such as screen-recorded image contents are often characterized by sharpness and colour vividness. When weighted blending prediction is performed on these image contents, sharpness and colour vividness are reduced because weighted blending prediction can be understood as a fuzzy prediction method, so that the prediction quality is reduced and noise is brought.

To solve the above technical problems, in the present disclosure, the weighted blending condition for the current block is determined according to the image content. That is to say, this disclosure provides differentiated weighted blending conditions for image contents, and different image contents correspond to different weighted blending conditions, so that it can be ensured that weighted blending prediction is performed on image contents that require weighted blending prediction, thereby improving prediction accuracy. Weighted blending prediction is not performed on the image content that does not require weighted blending prediction, thereby avoiding unnecessary noise and ensuring prediction quality.

A sequence includes a series of pictures, and since the series of pictures is often generated in the same environment, image contents of the series of pictures are substantially the same. Therefore, in the present disclosure, the weighted blending condition for the current block is determined according to the image content of the current sequence. It may be understood that the image content of the current block is of the same type as the image content of the current sequence, for example, both are screen contents or other contents captured by a camera, etc.

In some embodiments, the weighted blending condition for the current block is determined according to the image content of the current sequence. For example, when the image content of the current sequence is the first image content, the weighted blending condition for the current block is determined as a first blending condition. When the image content of the current sequence is the second image content, the weighted blending condition for the current block is determined as a second blending condition. When the image content of the current sequence is a third image content, the weighted blending condition for the current block is determined as a third blending condition . . . , and when the image content of the current sequence is the N-th image content, the weighted blending condition for the current block is determined as the N-th blending condition. The specific correspondence is illustrated in Table 1.

Table 1 illustrates that different image contents correspond to different weighted blending conditions, and Table 1 is preset. Therefore, after determining the image content of the current sequence, the video encoding device can determine the weighted blending condition corresponding to the image content of the current sequence as the weighted blending conditions for the current block by searching Table 1.

In some embodiments of the present disclosure, it may be understood that the weighted blending condition may change only when the image content of the current sequence is the first image content, and the weighted blending condition does not change when the image content of the current sequence is not the first image content. That is to say, if the image content of the current sequence is the first image content, the weighted blending condition to be used is the first blending condition, and if the image content of the current sequence is not the first image content, the weighted blending condition to be used is the second blending condition. The first blending condition is different from the second blending condition.

In some embodiments, in order to improve the efficiency of determining the weighted blending condition for the current block by the video decoder, a first flag is signalled into a bitstream by the video encoder, where the first flag indicates whether a first technology is used, and the first technology is used for the first image content. For example, if the image content of the current sequence is a first image content, the video encoder sets the first flag as 1 and then signals the first flag into the bitstream, and if the image content of the current sequence is not the first image content, the video encoder sets the first flag as 0 and then signals the first flag into the bitstream. In this way, the video decoder decodes the bitstream to obtain the first flag, and then determines the weighted blending condition for the current block according to the first flag.

Optionally, a new field is added to the bitstream to represent the first flag. For example, a field sps_timd_blend-off_flag is used to represent the first flag, and the field is an entirely new field.

Optionally, the first flag is reused with a third flag of the current sequence, that is, an existing field in the current sequence can be reused without adding a new field, thereby saving codewords. For example, the third field is an IBC enable flag or a TMP enable flag, etc.

In some embodiments, the operations at S602 above include the following operations.

At S602-B1, when the image content of the current sequence is a first image content, a first blending condition for the current block is determined.

At S602-B2, the first blending condition is determined as the weighted blending condition for the current block.

In this embodiment, when the video encoder knows that the image content of the current sequence is the first image content, the video encoder determines that the weighted blending condition for the current block needs to be modified and the existing weighted blending condition cannot be used. In this case, the video decoder re-determines the weighted blending condition for the current block. Specifically, the video encoder determines the first blending condition for the current block and determines the first blending condition as the weighted blending condition for the current block.

Methods for determining the first blending condition for the current block at S602-B1 include but are not limited to the following.

First method: a value of a first threshold coefficient is modified as a first preset value, and the first blending condition is determined according to a first cost corresponding to the first intra prediction mode, a second cost corresponding to the second intra prediction mode, and the modified first threshold coefficient.

The first threshold coefficient is used to determine the first blending condition.

In some embodiments, the first threshold coefficient has a default value, for example, 2 or another value. In embodiments of the present disclosure, if the image content of the current sequence is the first image content (for example, the screen-recorded content), the first threshold coefficient is modified, for example, modified from the default value to the first preset value. Then, the first blending condition is determined according to the first cost corresponding to the first intra prediction mode, the second cost corresponding to the second intra prediction mode, and the modified first threshold coefficient.

Optionally, the first preset value is less than the default value of the first threshold coefficient.

Optionally, the first preset value is a positive number less than 2, for example, 1.9 or 1.95, etc.

In an example, the first blending condition for the current block is determined to be that: the second cost is less than a product of the first cost and the modified first threshold coefficient. For example, the first blending condition for the current block is $cost2<a1*cost1$.

In this example, it is assumed that the value of the unmodified first threshold coefficient is a, the value of the modified first threshold coefficient is a1, and a is greater than a1. It is assumed that the existing weighted blending condition is $cost2<a*cost1$, and the modified weighted blending condition in the present disclosure is $cost2<a1*cost1$. Since a1 is less than a and cost1 is less than cost2, the modified weighted blending condition in the present disclosure is much stricter. For example, when cost2 satisfies the unmodified weighted blending condition, the value of cost2 is in the range of cost1<cost2<a*cost1, and when cost2 satisfies the modified weighted blending condition, the value of cost2 in the range of cost1<cost2<a1*cost1. Since a1 is less than a, the value of cost2 will be in the smaller range to make cost2 satisfy the modified weighted blending condition, so that it is difficult for the first intra prediction mode and the second intra prediction mode to satisfy the modified weighted blending condition in the present disclosure. Therefore, when the modified weighted blending condition is used to determine whether to perform weighted prediction, the probability of weighted prediction on the current block of the first image content can be reduced, thereby ensuring prediction quality of the current block of the first image content.

In this first method, assuming that the first blending condition for the current block is cost2<a1*cost1, then for determining the intermediate prediction value of the current block according to the weighted blending condition and at least one of the first intra prediction mode or the second intra prediction mode, operations at S603 include operations at S603-A1 below.

At S603-A1, when the second cost is less than the product of the first cost and the modified first threshold coefficient, the intermediate prediction value of the current block is determined by using the first intra prediction mode and the second intra prediction mode.

That is to say, when cost2<a1*cost1, it indicates that the first intra prediction mode and the second intra prediction mode satisfy the weighted blending condition for the current block, and thus weighted prediction is performed on the current block by using the first intra prediction mode and the second intra prediction mode to obtain the intermediate prediction value of the current block. For example, the current block is predicted by using the first intra prediction mode to obtain a first prediction value, the current block is predicted by using the second intra prediction mode to obtain a second prediction value, and the intermediate prediction value of the current block is obtained by weighting the first prediction value and the second prediction value. For example, according to the weighting method illustrated in the formula (1) to the formula (3) above, a weighting operation is performed to obtain the intermediate prediction value of the current block.

In some embodiments, the operations at S603 further include operations at S603-A2 below.

At S603-A2, when the second cost is greater than or equal to the product of the first cost and the modified first threshold coefficient, the intermediate prediction value of the current block is determined by using the first intra prediction mode.

In embodiments of the present disclosure, when the first intra prediction mode and the second intra prediction mode do not satisfy the above weighted blending condition for the current block, i.e., do not satisfy cost2<a1*cost1, or in other words, the second cost corresponding to the second intra prediction mode is greater than or equal to the product of the first cost corresponding to the first intra prediction mode and the modified first threshold coefficient, then the video encoder does not perform weighted prediction on the current block but performs prediction by using an intra prediction mode with the lowest cost in the first intra prediction mode and the second intra prediction mode. As can be seen from above, since the first cost is less than the second cost, the video encoder predicts the current block by directly using the first intra prediction mode and determines the obtained prediction value as the intermediate prediction value of the current block.

In this first method, when the video encoder knows that the image content of the current sequence is the first image content, the video encoder modifies the value of the first threshold coefficient as the first preset value and determines the first blending condition according to the first cost corresponding to the first intra prediction mode, the second cost corresponding to the second intra prediction mode, and the modified first threshold coefficient. For example, the second cost being less than the product of the first cost and the modified first threshold coefficient is determined as the first blending condition, and then the first blending condition for the current block is determined as the weighted blending condition for the current block. In this first method, since the first threshold coefficient is modified to be smaller, the weighted blending condition for the current block becomes much stricter, so that the probability that the first intra prediction mode and the second intra prediction mode satisfy the modified weighted blending condition in the present disclosure can be reduced, and thus the probability of weighted prediction on the current block of the first image content can be reduced, thereby ensuring prediction quality of the current block of the first image content.

In some embodiments, the video encoder may also determine the first blending condition for the current block in a second method below.

Second method: the first blending condition for the current block is determined according to a first cost corresponding to the first intra prediction mode and a second cost corresponding to the second intra prediction mode.

In this second method, the first blending condition for the current block is directly determined according to the first cost and the second cost, which can simplify the process of determining the first blending condition for the current block, improve the speed of determining based on the first blending condition whether to perform weighted prediction on the current block, and thus improve the encoding efficiency.

The present disclosure does not limit a manner for determining the first blending condition for the current block according to the first cost and the second cost.

In an example, at least one of the first cost or the second cost being greater than or equal to a first preset threshold is determined as the first blending condition for the current block. For example, the first blending condition for the current block is that at least one of the first cost or the second cost is greater than or equal to the first preset threshold. The present disclosure does not limit a specific value of the first preset threshold, which can be determined according to actual needs. In this example, if the first cost corresponding to the first intra prediction mode and/or the second cost corresponding to the second intra prediction mode are greater than or equal to the first preset value, it indicates that the prediction efficiency of the first intra prediction mode and/or the second intra prediction mode is poor. In this case, in order to improve the prediction effect of the current block, weighted prediction may be performed based on the first intra prediction mode and the second intra prediction mode, that is, the intermediate prediction value of the current block is determined by weighting the prediction values that are obtained by using the first intra prediction mode and the second intra prediction mode respectively, so as to improve the prediction effect of the current block.

In this second method, assuming that the first blending condition for the current block is that at least one of the first cost or the second cost is greater than or equal to the first preset threshold, then for determining the intermediate prediction value of the current block according to the weighted blending condition and at least one of the first intra prediction mode or the second intra prediction mode, the operations at S603 include operations at S603-B1 below.

At S603-B1, when at least one of the first cost or the second cost is greater than or equal to the first preset threshold, the intermediate prediction value of the current block is determined by using the first intra prediction mode and the second intra prediction mode.

That is to say, when at least one of the first cost or the second cost is greater than or equal to the first preset threshold, it indicates that the prediction effect of the first intra prediction mode and/or the second intra prediction mode for the current block is poor. In this case, if only a prediction mode with the lowest cost is used for prediction, the prediction may be inaccurate because the prediction efficiency of the prediction mode with the lowest cost cannot be ensured. In order to improve the prediction effect of the current block, when the video encoder determines that at least one of the first cost or the second cost is greater than or equal to the first preset threshold, the video encoder determines the intermediate prediction value of the current block by using the first intra prediction mode and the second intra prediction mode. For example, the video encoder predicts the current block by using the first intra prediction mode to obtain a first prediction value, predicts the current block by using the second intra prediction mode to obtain a second prediction value, and obtains the intermediate prediction value of the current block by weighting the first prediction value and the second prediction value. For example, according to the weighting method illustrated in the formula (1) to the formula (3) above, a weighting operation is performed to obtain the intermediate prediction value of the current block.

In some embodiments, the operations at S603 further include operations at S603-B2 below.

At S603-B2, when the first cost and the second cost are both less than the first preset threshold, the intermediate prediction value of the current block is determined by using the first intra prediction mode.

In embodiments of the present disclosure, when the first intra prediction mode and the second intra prediction mode do not satisfy the above weighted blending conditions for the current block, i.e., when the first cost corresponding to the first intra prediction mode and the second cost corresponding to the second intra prediction mode are both less than the first preset value, it indicates that prediction effects of the first intra prediction mode and the second intra prediction mode for the current block are relatively good. In this case, when the current block is predicted by using one intra prediction mode, a better prediction effect can be achieved. If a weighted prediction method is used, i.e., if weighted prediction is performed on the current block by using the first intra prediction mode and the second intra prediction mode, the prediction effect of the current block may be reduced instead, for example, sharpness and colour vividness of the current block may be reduced. Therefore, in this case, in order to ensure the prediction quality of the current block, when the first cost and the second cost are both less than the first preset threshold, the video encoder uses an intra prediction mode with the lowest cost in the first intra prediction mode and the second intra prediction mode for prediction. As can be seen from above, since the first cost is less than the second cost, the video encoder predicts the current block by directly using the first intra prediction mode, and determines the obtained prediction value as the intermediate prediction value of the current block.

In this second method, when the video encoder knows that the image content of the current sequence is the first image content, the video encoder determines the first blending condition according to the first cost corresponding to the first intra prediction mode and the second cost corresponding to the second intra prediction mode. For example, at least one of the first cost or the second cost being greater than or equal to the first preset threshold is determined as the first blending condition, and then the first blending condition for the current block is determined as the weighted blending condition for the current block. In this second method, if at least one of the first cost or the second cost is greater than or equal to the first preset threshold, it indicates that the prediction effect of the first intra prediction mode and/or the second intra prediction mode for the current block is poor. In order to improve the prediction effect of the current block, the video encoder determines the intermediate prediction value of the current block by using the first intra prediction mode and the second intra prediction mode. If the first cost and the second cost are both less than the first preset threshold, it indicates that prediction effects of the first intra prediction mode and the second intra prediction mode for the current block are relatively good. In this case, in order to ensure the prediction effect of the current block and reduce the prediction complexity, the intermediate prediction value of the current block is determined by using the first intra prediction mode.

It may be noted that the second method may be used to determine weighted blending conditions for other picture blocks in addition to the weighted blending condition for the current block whose image content is the first image content. That is to say, the above second method can be used to determine a first new weighted blending condition for determining whether weighted blending prediction is needed for a picture block.

In some embodiments, the video encoder may further determine the first blending condition for the current block in a third method below.

Third method: the first blending condition is determined according to the first intra prediction mode and the second intra prediction mode.

In this third method, the first blending condition for the current block is directly determined according to the first intra prediction mode and the second intra prediction mode, which can simplify the process of determining the first blending condition for the current block, improve the speed of determining based on the first blending condition whether to perform weighted prediction on the current block, and thus improve the encoding efficiency.

The present disclosure does not limit a manner for determining the first blending condition for the current block according to the first intra prediction mode and the second intra prediction mode.

In an example, the difference between the index number of the first intra prediction mode and the index number of the second intra prediction mode being greater than or equal to a second preset threshold is determined as the first blending condition for the current block. For example, the first blending condition for the current block is mode1_idx & mode2_idx>d, where d is the second preset threshold. The present disclosure does not limit a specific value of the second preset threshold, which can be determined according to actual needs, for example, the second preset threshold is 3 or 4, etc. When the difference between the index number of the first intra prediction mode and the index number of the second intra prediction mode is greater than or equal to the second preset threshold, it indicates that the difference between the first intra prediction mode and the second intra prediction mode is relatively large and the corresponding prediction effects are quite different. In this case, in order to improve the prediction effect of the current block, weighted prediction may be performed based on the first intra prediction mode and the second intra prediction mode, that is, the intermediate prediction value of the current block is determined by weighting the prediction values that are obtained by using the first intra prediction mode and the second intra prediction mode respectively, so as to improve the prediction effect of the current block.

In this third method, assuming that the first blending condition for the current block is that the difference between the index number of the first intra prediction mode and the index number of the second intra prediction mode is greater than or equal to the second preset threshold, then for determining the intermediate prediction value of the current block according to the weighted blending condition and at least one of the first intra prediction mode or the second intra prediction mode, the operations at S603 includes operations at S603-C1 below.

At S603-C1, when the difference between the index number of the first intra prediction mode and the index number of the second intra prediction mode is greater than or equal to the second preset threshold, the intermediate prediction value of the current block is determined by using the first intra prediction mode and the second intra prediction mode.

That is to say, when the difference between the index number of the first intra prediction mode and the index number of the second intra prediction mode is greater than or equal to the second preset threshold, it indicates that the difference between the first intra prediction mode and the second intra prediction mode is relatively large and the corresponding prediction effects are quite different. In this case, if only a prediction mode with the lowest cost is used for prediction, the prediction may be inaccurate. In order to improve the prediction effect of the current block, when the video encoder determines that the difference between the index number of the first intra prediction mode and the index number of the second intra prediction mode is greater than or equal to the second preset threshold, the video encoder determines the intermediate prediction value of the current block by using the first intra prediction mode and the second intra prediction mode. For example, the video encoder predicts the current block by using the first intra prediction mode to obtain a first prediction value, predicts the current block by using the second intra prediction mode to obtain a second prediction value, and obtains the intermediate prediction value of the current block by weighting the first prediction value and the second prediction value. For example, according to the weighting method illustrated in the formula (1) to the formula (3) above, a weighting operation is performed to obtain the intermediate prediction value of the current block.

In some embodiments, the operations at S603 further include operations at S603-C2 below.

At S603-C2, when the difference between the index number of the first intra prediction mode and the index number of the second intra prediction mode is less than the second preset threshold, the intermediate prediction value of the current block is determined by using the first intra prediction mode.

In embodiment of the present disclosure, when the first intra prediction mode and the second intra prediction mode do not satisfy the above weighted blending condition for the current block, i.e., when the difference between the index number of the first intra prediction mode and the index number of the second intra prediction mode is less than the second preset threshold, it indicates that prediction effects of the first intra prediction mode and the second intra prediction mode for the current block are approximate. In this case, when the current block is predicted by using one intra prediction mode, a better prediction effect can be achieved. If a weighted prediction method is used, i.e., if weighted prediction is performed on the current block by using the first intra prediction mode and the second intra prediction mode, the prediction effect of the current block may be reduced instead, for example, sharpness and colour vividness of the current block may be reduced and prediction complexity may be increased. Therefore, in this case, in order to ensure the prediction quality of the current block and reduce the prediction complexity, when the difference between the index number of the first intra prediction mode and the index number of the second intra prediction mode is less than the second preset threshold, the video encoder uses an intra prediction mode with the lowest cost in the first intra prediction mode and the second intra prediction mode for prediction. As can be seen from above, since the first cost is less than the second cost, the video encoder predicts the current block by directly using the first intra prediction mode, and determines the obtained prediction value as the intermediate prediction value of the current block.

In this third method, when the video encoder knows that the image content of the current sequence is the first image content, the video encoder determines the first blending condition according to the first intra prediction mode and the second intra prediction mode. For example, the difference between the index number of the first intra prediction mode and the index number of the second intra prediction mode being greater than or equal to the second preset threshold is determined as the first blending condition, and then the first blending condition for the current block is determined as the weighted blending condition for the current block. In this third method, if the difference between the index number of the first intra prediction mode and the index number of the second intra prediction mode is greater than or equal to the second preset threshold, it indicates that the difference between the first intra prediction mode and the second intra prediction mode is relatively large and the corresponding prediction effects are quite different. In this case, in order to improve the prediction effect of the current block, the intermediate prediction value of the current block is determined by weighting the prediction values that are obtained by using the first intra prediction mode and the second intra prediction mode respectively, so as to improve the prediction effect of the current block. If the difference between the index number of the first intra prediction mode and the index number of the second intra prediction mode is less than the second preset threshold, it indicates that prediction effects of the first intra prediction mode and the second intra prediction mode for the current block are approximate. In this case, in order to ensure the prediction effect of the current block and reduce the prediction complexity, the intermediate prediction value of the current block is determined by using the first intra prediction mode.

It may be noted that the third method may be used to determine weighted blending conditions for other picture blocks in addition to the weighted blending condition for the current block whose image content is the first image content. That is to say, the above third method can be used to determine a first new weighted blending condition for determining whether weighted blending prediction is needed for a picture block.

According to the above methods, the intermediate prediction value of the current block may be determined according to the first intra prediction mode and/or the second intra prediction mode. Then, operations at S604 are executed.

At S604, a target prediction value of the current block is determined according to the intermediate prediction value.

In some embodiments, the intermediate prediction value of the current block may be directly determined as the target prediction value of the current block.

In some embodiments, a cost of the intermediate prediction value needs to be compared with a cost of a prediction value corresponding to another prediction mode, and the target prediction value of the current block is determined according to the costs. Specifically, the operations at S604 include the following operations.

At S604-A1, a first encoding cost corresponding to the intermediate prediction value is determined according to the intermediate prediction value.

The first encoding cost may be an RDO cost, and optionally, may also be an approximation cost such as SAD or SATD, which is not limited in the present disclosure.

At S604-A2, second encoding costs when predicting the current block using intra prediction modes respectively in a candidate prediction set are determined.

The candidate prediction set includes at least one intra prediction mode. The intra prediction modes in the candidate prediction set are traversed, and the second encoding costs corresponding to the respective intra prediction modes in the candidate prediction set are obtained by performing predictive coding on the current block using the intra prediction modes respectively.

Optionally, if the first intra prediction mode and the second intra prediction mode are determined according to the MPM list, the above candidate prediction set does not include any intra prediction mode in the MPM list.

At S604-A3, the target prediction value of the current block is determined as a prediction value corresponding to a lowest encoding cost among the first encoding cost and the second encoding costs.

In some embodiments, when the first encoding cost is the lowest encoding cost among the first encoding cost and the second encoding costs, the above intermediate prediction value is determined as the target prediction value of the current block. In this case, the second flag is set as true and then is signalled into a bitstream. For example, the TIMD enable flag is set as true, for example, set as 1, and then is signalled into the bitstream.

In some embodiments, when the first encoding cost is not the lowest encoding cost among the first encoding cost and the second encoding costs, the second flag is set as false and then is signalled into the bitstream. For example, the TIMD enable flag is set as false, for example, set as 0, and then is signalled into the bitstream. The second flag indicates whether the target prediction value of the current block is determined according to at least one of the first intra prediction mode or the second intra prediction mode.

In the intra prediction method of embodiments of the present disclosure, the video encoder determines the first intra prediction mode and the second intra prediction mode for the current block. Next, the video encoder determines the weighted blending condition for the current block according to the image content of the current sequence, where the weighted blending condition is used to determine whether weighted prediction is performed on the current block based on the first intra prediction mode and the second intra prediction mode. Then, the video encoder determines the intermediate prediction value of the current block according to the weighted blending condition and at least one of the first intra prediction mode or the second intra prediction mode. Finally, the video encoder determines the target prediction value of the current block according to the intermediate prediction value. That is, in the present disclosure, the weighted blending condition for the current block is determined according to the image content of the current sequence, and whether weighted blending prediction is performed on the current block is determined based on the weighted blending condition. In this way, weighted blending prediction will not be performed on the image content that does not require weighted blending prediction, so that prediction quality will not be reduced and unnecessary noise can be avoided, thereby improving accuracy of intra prediction.

A decoding process in which the intra prediction method provided in the present disclosure is combined with the TIMD technology will be introduced below.

Figure 11:
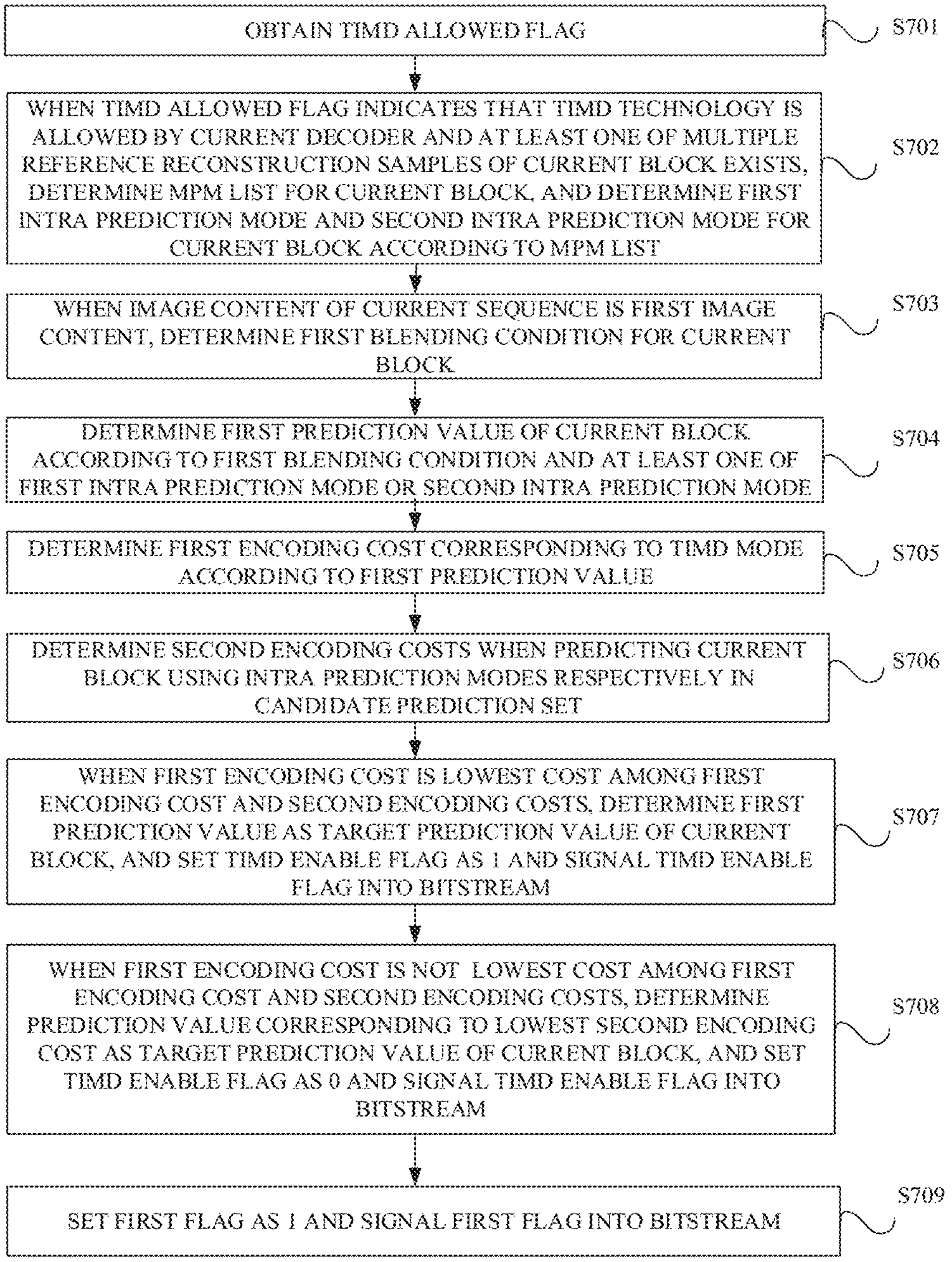
FIG. 11 is a schematic flowchart of an intra prediction method provided in embodiments of the present disclosure.

FIG. 11 is a schematic flowchart of an intra prediction method provided in embodiments of the present disclosure. As illustrated in FIG. 11, the intra prediction method includes the following.

At S701, a TIMD allowed flag is obtained.

The TIMD allowed flag indicates whether the TIMD technology is allowed by a current decoder.

At S702, when the TIMD allowed flag indicates that the TIMD technology is allowed by a current decoder and at least one of multiple reference reconstruction samples of the current block exists, an MPM list for the current block is determined, and the first intra prediction mode and the second intra prediction mode for the current block are determined according to the MPM list.

For specific details, reference can be made to the description of S601 above, which is not repeated herein.

At S703, when the image content of the current sequence is a first image content, a first blending condition for the current block is determined.

For example, a value of a first threshold coefficient is modified as a first preset value, and the first blending condition is determined according to a first cost corresponding to the first intra prediction mode, a second cost corresponding to the second intra prediction mode, and the modified first threshold coefficient.

For example, the first blending condition for the current block is determined according to the first cost corresponding to the first intra prediction mode and the second cost corresponding to the second intra prediction mode.

For example, the first blending condition is determined according to the first intra prediction mode and the second intra prediction mode.

For specific details, reference can be made to the description of S602 above, which is not repeated herein.

At S704, the intermediate prediction value of the current block is determined according to the first blending condition and at least one of the first intra prediction mode or the second intra prediction mode.

For specific details, reference can be made to the description of S603 above, which is not repeated herein.

At S705, a first encoding cost corresponding to a TIMD mode is determined according to the intermediate prediction value.

Optionally, the first encoding cost is a rate-distortion cost.

At S706, second encoding costs when predicting the current block using intra prediction modes respectively in a candidate prediction set are determined.

At S707, when the first encoding cost is the lowest cost among the first encoding cost and the second encoding costs, the intermediate prediction value is determined as a target prediction value of the current block, and a TIMD enable flag is set as 1 and then signalled into a bitstream.

The TIMD enable flag indicates whether a TIMD technology is used for the current block.

At S708, when the first encoding cost is not the lowest cost among the first encoding cost and the second encoding costs, the target prediction value of the current block is determined as a prediction value corresponding to a lowest second encoding cost, and the TIMD enable flag is set as 0 and then signaled into the bitstream.

At S709, a first flag is set as 1 and then signaled into the bitstream.

In embodiments of the present disclosure, the weighted blending condition in the TIMD technology is adjusted, for example, the weighted blending condition for the current block is determined according to the image content of the current sequence, and whether to perform weighted blending prediction on the current block is determined based on the weighted blending condition. In this way, weighted blending prediction will not be performed on the image content that does not require weighted blending prediction, so that prediction quality will not be reduced and unnecessary noise can be avoided, thereby improving accuracy of intra prediction.

It may be understood that FIG. 8 to FIG. 11 are only examples of the present disclosure, which may not be construed as a limitation to the present disclosure.

The preferred implementations of the present disclosure have been described in detail above in conjunction with the accompanying drawings. However, the present disclosure is not limited to the specific details in the above implementations. Within the scope of the technical concept of the present disclosure, various simple modifications may be made to the technical solutions of the present disclosure. These simple modifications all belong to the protection scope of the present disclosure. For example, the various specific technical features described in the above specific implementation manners can be combined in any suitable manner if there is no contradiction. To avoid unnecessary repetition, various possible combination manners are not further described in this disclosure. For another example, any combination of various implementations of the present disclosure can also be made, as long as they do not violate the idea of the present disclosure, which may also be regarded as the content disclosed in the present disclosure.

It may also be understood that in the various method embodiments of the present disclosure, the sequence numbers of the above-mentioned processes do not mean the order of execution, and the order of execution of the processes may be determined by their functions and internal logic, which shall not constitute any limitation to the implementation of embodiments of the present disclosure. In addition, in embodiments of the present disclosure, the term "and/or" is only an association relationship describing associated objects, indicating that there may be three relationships. Specifically, A and/or B may mean A exists alone, A and B exist simultaneously, and B exists alone. In addition, the character "/" in this article generally indicates that the contextual objects are an "or" relationship.

The method embodiments in the present disclosure are described in detail above with reference to FIG. 8 to FIG. 11. In the following, apparatus embodiments of the present disclosure will be described in detail with reference to FIG. 12 to FIG. 14.

Figure 12:
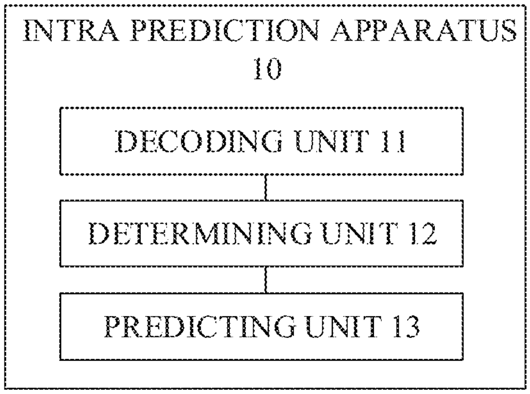
FIG. 12 is a schematic block diagram of an intra prediction apparatus provided in an embodiment of the present disclosure.

FIG. 12 is a schematic block diagram of an intra prediction apparatus provided in an embodiment of the present disclosure.

As illustrated in FIG. 12, the intra prediction apparatus 10 includes a decoding unit 11, a determining unit 12, and a predicting unit 13. The decoding unit 11 is configured to decode a bitstream to determine a first intra prediction mode and a second intra prediction mode for a current block. The determining unit 12 is configured to determine a weighted blending condition for the current block according to an image content of a current sequence, where the weighted blending condition is used to determine whether weighted prediction is performed on the current block based on the first intra prediction mode and the second intra prediction mode. The predicting unit 13 is configured to determine a target prediction value of the current block according to the weighted blending condition and at least one of the first intra prediction mode or the second intra prediction mode.

In some embodiments, the determining unit 12 is specifically configured to decode the bitstream to obtain a first flag, where the first flag indicates whether a first technology is used, and the first technology is used for a first image content; and determine the weighted blending condition for the current block according to the first flag.

In some embodiments, the determining unit 12 is specifically configured to determine a first blending condition for the current block when the first flag indicates that the first technology is used; and determine the first blending condition as the weighted blending condition for the current block.

In some embodiments, the determining unit 12 is specifically configured to modify a value of a first threshold coefficient as a first preset value, where the first threshold coefficient is used to determine the first blending condition. The determining unit 12 is specifically configured to determine the first blending condition according to a first cost corresponding to the first intra prediction mode, a second cost corresponding to the second intra prediction mode, and the modified first threshold coefficient.

Optionally, the first blending condition is that the second cost is less than a product of the first cost and the modified first threshold coefficient.

In some embodiments, the predicting unit 13 is specifically configured to determine the target prediction value of the current block by using the first intra prediction mode and the second intra prediction mode, when the second cost is less than the product of the first cost and the modified first threshold coefficient.

In some embodiments, the predicting unit 13 is specifically configured to determine the target prediction value of the current block by using the first intra prediction mode, when the second cost is greater than or equal to the product of the first cost and the modified first threshold coefficient.

Optionally, the first preset value is a positive number less than 2.

In some embodiments, the determining unit 12 is specifically configured to determine the first blending condition according to a first cost corresponding to the first intra prediction mode and a second cost corresponding to the second intra prediction mode.

Optionally, the first blending condition is that at least one of the first cost or the second cost is greater than or equal to a first preset threshold.

In some embodiments, the predicting unit 13 is specifically configured to determine the target prediction value of the current block by using the first intra prediction mode and the second intra prediction mode, when at least one of the first cost or the second cost is greater than or equal to the first preset threshold.

In some embodiments, the predicting unit 13 is specifically configured to determine the target prediction value of the current block by using the first intra prediction mode, when the first cost and the second cost are both less than the first preset threshold.

In some embodiments, the determining unit 12 is specifically configured to determine the first blending condition according to the first intra prediction mode and the second intra prediction mode.

Optionally, the first blending condition is that a difference between an index number of the first intra prediction mode and an index number of the second intra prediction mode is greater than or equal to a second preset threshold.

In some embodiments, the predicting unit 13 is specifically configured to determine the target prediction value of the current block by using the first intra prediction mode and the second intra prediction mode, when the difference between the index number of the first intra prediction mode and the index number of the second intra prediction mode is greater than or equal to the second preset threshold.

In some embodiments, the predicting unit 13 is specifically configured to determine the target prediction value of the current block by using the first intra prediction mode, when the difference between the index number of the first intra prediction mode and the index number of the second intra prediction mode is less than the second preset threshold.

In some embodiments, the determining unit 12 is specifically configured to determine the weighted blending condition for the current block according to the image content of the current sequence, when at least one of the first intra prediction mode or the second intra prediction mode is an angular prediction mode.

In some embodiments, the predicting unit 13 is further configured to determine the target prediction value of the current block according to the first intra prediction mode, when each of the first intra prediction mode and the second intra prediction mode is a non-angular prediction mode.

In some embodiments, the decoding unit 11 is specifically configured to determine an MPM list for the current block, and determine the first intra prediction mode and the second intra prediction mode according to the MPM list.

In some embodiments, the decoding unit 11 is specifically configured to determine one candidate intra prediction mode in the MPM list as the first intra prediction mode, and determine one candidate intra prediction mode in the MPM list other than the first intra prediction mode as the second intra prediction mode.

In some embodiments, the decoding unit 11 is specifically configured to determine costs when predicting the current block using candidate intra prediction modes respectively in the MPM list, and determine the first intra prediction mode and the second intra prediction mode according to the costs corresponding to the candidate intra prediction modes in the MPM list.

In some embodiments, the decoding unit 11 is specifically configured to decode the bitstream to obtain a TIMD enable flag, where the TIMD enable flag indicates whether a TIMD technology is used for the current block. The decoding unit 11 is specifically configured to determine the first intra prediction mode and the second intra prediction mode for the current block when the TIMD enable flag indicates that the TIMD technology is used for the current block.

In some embodiments, when the TIMD enable flag indicates that the TIMD technology is used for the current block, the decoding unit 11 is specifically configured to determine an MPM list for the current block when the TIMD enable flag indicates that the TIMD technology is used for the current block and at least one of multiple reference reconstruction samples of the current block exists; and determine the first intra prediction mode and the second intra prediction mode for the current block according to the MPM list.

In some embodiments, the decoding unit 11 is specifically configured to determine costs when predicting the template region of the current block using the candidate intra prediction modes respectively in the MPM list, if the number of candidate intra prediction modes in the MPM list is greater than 1. The decoding unit 11 is specifically configured to determine the first intra prediction mode and the second intra prediction mode according to the costs corresponding to the candidate intra prediction modes in the MPM list.

In some embodiments, the decoding unit 11 is specifically configured to: for each of the candidate intra prediction modes in the MPM list, determine a prediction value of the template region of the current block by using the candidate intra prediction mode, and determine a cost corresponding to the candidate intra prediction mode according to the prediction value corresponding to the candidate intra prediction mode and the reconstructed value of the template region.

In some embodiments, the decoding unit 11 is specifically configured to determine a candidate intra prediction mode with a lowest cost in the MPM list as the first intra prediction mode, and determine a candidate intra prediction mode with a second lowest cost in the MPM list as the second intra prediction mode.

In some embodiments, the predicting unit 13 is further configured to predict the current block by using a Planar mode to obtain the target prediction value of the current block, when the TIMD enable flag indicates that the TIMD technology is used for the current block and each of the multiple reference reconstruction samples of the current block does not exist.

In some embodiments, the decoding unit 11 is specifically configured to determine the candidate intra prediction mode with the lowest cost in the MPM list as a first initial mode, and determine the candidate intra prediction mode with the second lowest cost in the MPM list as a second initial mode. When at least one of the first initial mode or the second initial mode is an angular prediction mode, the angular prediction mode of the first initial mode and the second initial mode is offset according to a preset offset, so as to obtain the first intra prediction mode and the second intra prediction mode.

In some embodiments, the decoding unit 11 is further configured to determine the first initial mode as the first intra prediction mode and determine the second initial mode as the second intra prediction mode, if neither the first initial mode nor the second initial mode is the angular prediction mode.

In some embodiments, the decoding unit 11 is further configured to decode the bitstream to obtain a second flag, where the second flag indicates whether the target prediction value of the current block is determined according to at least one of the first intra prediction mode or the second intra prediction mode. The decoding unit 11 is further configured to determine the first intra prediction mode and the second intra prediction mode, when the second flag is true.

Optionally, the second flag is a TIMD enable flag.

In some embodiments, the determining unit 12 is further configured to determine a type of a current frame where the current block is located, and determine according to the type of the current frame whether the weighted blending condition for the current block is determined according to the image content of the current sequence.

In some embodiments, the determining unit 12 is further configured to determine the weighted blending condition for the current block according to the image content of the current sequence, when the type of the current frame is a target frame-type.

Optionally, the target frame-type includes at least one of an I frame, a P frame, or a B frame.

In some embodiments, the determining unit 12 is further configured to determine a type of a current frame where the current block is located and a size of the current block, and determine according to the type of the current frame and the size of the current block whether the weighted blending condition for the current block is determined according to the image content of the current sequence.

In some embodiments, the determining unit 12 is further configured to determine the weighted blending condition for the current block according to the image content of the current sequence, when the type of the current frame is a first frame-type and the size of the current block is greater than a first threshold. The determining unit 12 is further configured to determine the weighted blending condition for the current block according to the image content of the current sequence, when the type of the current frame is a second frame-type and the size of the current block is greater than a second threshold.

Optionally, when the first frame-type is an I frame and the second frame-type is a B frame or a P frame, the second threshold is different from the first threshold.

In some embodiments, the determining unit 12 is further configured to determine a quantization parameter corresponding to the current block, and determine according to the quantization parameter whether the weighted blending condition for the current block is determined according to the image content of the current sequence.

In some embodiments, the determining unit 12 is further configured to determine the weighted blending condition for the current block according to the image content of the current sequence, when the quantization parameter is less than a third threshold.

Optionally, the first flag is reused with a third flag of the current sequence.

Optionally, the third flag is an IBC enable flag or a TMP enable flag of a sequence level.

It may be understood that the apparatus embodiments and the method embodiments may correspond to each other, and similar descriptions may refer to the method embodiments. To avoid repetition, details are not repeated herein. Specifically, the apparatus 10 as illustrated in FIG. 12 can execute the intra prediction method in embodiments of the present disclosure, and the aforementioned and other operations and/or functions of each unit in the apparatus 10 are configured to implement related operations of the intra prediction method. For the sake of brevity, the corresponding processes are not repeated herein.

Figure 13:
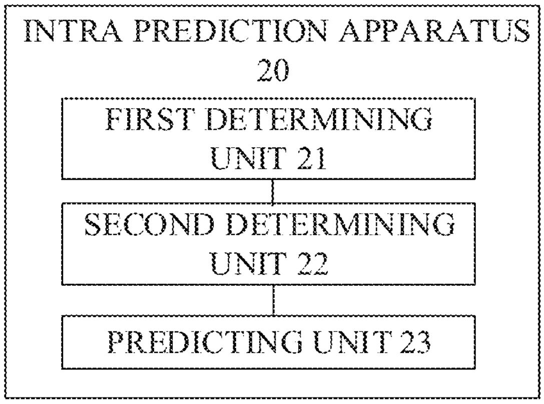
FIG. 13 is a schematic block diagram of an intra prediction apparatus provided in an embodiment of the present disclosure.

FIG. 13 is a schematic block diagram of an intra prediction apparatus provided in an embodiment of the present disclosure.

As illustrated in FIG. 13, the intra prediction apparatus 20 includes a first determining unit 21, a second determining unit 22, and a predicting unit 23. The first determining unit 21 is configured to determine a first intra prediction mode and a second intra prediction mode for a current block. The second determining unit 22 is configured to determine a weighted blending condition for the current block according to an image content of a current sequence, where the weighted blending condition is used to determine whether weighted prediction is performed on the current block based on the first intra prediction mode and the second intra prediction mode. The predicting unit 23 is configured to determine a intermediate prediction value of the current block according to the weighted blending condition and at least one of the first intra prediction mode or the second intra prediction mode, and determine a target prediction value of the current block according to the intermediate prediction value.

In some embodiments, the second determining unit 22 is specifically configured to determine a first blending condition for the current block when the image content of the current sequence is a first image content, and determine the first blending condition as the weighted blending condition for the current block.

In some embodiments, the predicting unit 23 is further configured to signal a first flag into a bitstream, where the first flag indicates whether a first technology is used, and the first technology is used for the first image content.

In some embodiments, the second determining unit 22 is specifically configured to modify a value of a first threshold coefficient as a first preset value, where the first threshold coefficient is used to determine the first blending condition; and determine the first blending condition according to a first cost corresponding to the first intra prediction mode, a second cost corresponding to the second intra prediction mode, and the modified first threshold coefficient.

Optionally, the first blending condition is that the second cost is less than a product of the first cost and the modified first threshold coefficient.

In some embodiments, the predicting unit 23 is specifically configured to determine the intermediate prediction value of the current block by using the first intra prediction mode and the second intra prediction mode, when the second cost is less than the product of the first cost and the modified first threshold coefficient.

In some embodiments, the predicting unit 23 is specifically configured to determine the intermediate prediction value of the current block by using the first intra prediction mode, when the second cost is greater than or equal to the product of the first cost and the modified first threshold coefficient.

Optionally, the first preset value is positive number less than 2.

In some embodiments, the second determining unit 22 is specifically configured to determine the first blending condition according to a first cost corresponding to the first intra prediction mode and a second cost corresponding to the second intra prediction mode.

Optionally, the first blending condition is that at least one of the first cost or the second cost is greater than or equal to a first preset threshold.

In some embodiments, the predicting unit 23 is specifically configured to determine the intermediate prediction value of the current block by using the first intra prediction mode and the second intra prediction mode, when at least one of the first cost or the second cost is greater than or equal to a first preset threshold.

In some embodiments, the predicting unit 23 is specifically configured to determine the intermediate prediction value of the current block by using the first intra prediction mode, when the first cost and the second cost are both less than the first preset threshold.

In some embodiments, the second determining unit 22 is specifically configured to determine the first blending condition according to the first intra prediction mode and the second intra prediction mode.

Optionally, the first blending condition is that a difference between an index number of the first intra prediction mode and an index number of the second intra prediction mode is greater than or equal to a second preset threshold.

In some embodiments, the predicting unit 23 is specifically configured to determine the intermediate prediction value of the current block by using the first intra prediction mode and the second intra prediction mode, when the difference between the index number of the first intra prediction mode and the index number of the second intra prediction mode is greater than or equal to the second preset threshold.

In some embodiments, the predicting unit 23 is specifically configured to determine the intermediate prediction value of the current block by using the first intra prediction mode, when the difference between the index number of the first intra prediction mode and the index number of the second intra prediction mode is less than the second preset threshold.

In some embodiments, the second determining unit 22 is specifically configured to determine the weighted blending condition for the current block according to the image content of the current sequence, when at least one of the first intra prediction mode or the second intra prediction mode is an angular prediction mode.

In some embodiments, the predicting unit 23 is further configured to determine the intermediate prediction value of the current block according to the first intra prediction mode, when each of the first intra prediction mode and the second intra prediction mode is a non-angular prediction mode.

In some embodiments, the first determining unit 21 is specifically configured to obtain an MPM list for the current block, and determine the first intra prediction mode and the second intra prediction mode according to the MPM list.

In some embodiments, the first determining unit 21 is specifically configured to determine one candidate intra prediction mode in the MPM list as the first intra prediction mode, and determine one candidate intra prediction mode in the MPM list other than the first intra prediction mode as the second intra prediction mode.

In some embodiments, the first determining unit 21 is specifically configured to determine costs when predicting the current block using candidate intra prediction modes respectively in the MPM list, and determine the first intra prediction mode and the second intra prediction mode according to the costs corresponding to the candidate intra prediction modes in the MPM list.

In some embodiments, the first determining unit 21 is specifically configured to obtain a TIMD allowed flag, where the TIMD allowed flag indicates whether a TIMD technology is allowed for the current sequence. The first determining unit 21 is specifically configured to determine the first intra prediction mode and the second intra prediction mode for the current block when the TIMD allowed flag indicates that the TIMD technology is allowed for the current sequence.

In some embodiments, when the TIMD allowed flag indicates that the TIMD technology is allowed for the current sequence, the first determining unit 21 is specifically configured to obtain an MPM list for the current block when the TIMD allowed flag indicates that the TIMD technology is allowed for the current sequence and at least one of multiple reference reconstruction samples of the current block exists; and determine the first intra prediction mode and the second intra prediction mode for the current block according to the MPM list.

In some embodiments, the first determining unit 21 is specifically configured to determine costs when predicting the template region of the current block using the candidate intra prediction modes respectively in the MPM list, if the number of candidate intra prediction modes in the MPM list is greater than 1. The first determining unit 21 is specifically configured to determine the first intra prediction mode and the second intra prediction mode according to the costs corresponding to the candidate intra prediction modes in the MPM list.

In some embodiments, the first determining unit 21 is specifically configured to: for each of the candidate intra prediction modes in the MPM list, determine a prediction value of the template region of the current block by using the candidate intra prediction mode, and determine a cost corresponding to the candidate intra prediction mode according to the prediction value corresponding to the candidate intra prediction mode and the reconstructed value of the template region.

In some embodiments, the first determining unit 21 is specifically configured to determine a candidate intra prediction mode with a lowest cost in the MPM list as the first intra prediction mode, and determine a candidate intra prediction mode with a second lowest cost in the MPM list as the second intra prediction mode.

In some embodiments, the predicting unit 23 is further configured to predict the current block by using a Planar mode to obtain the intermediate prediction value of the current block, when the TIMD allowed flag indicates that the TIMD technology is allowed for the current sequence and each of the multiple reference reconstruction samples of the current block does not exist.

In some embodiments, the first determining unit 21 is further configured to determine the candidate intra prediction mode with the lowest cost in the MPM list as a first initial mode, and determine the candidate intra prediction mode with the second lowest cost in the MPM list as a second initial mode. When at least one of the first initial mode or the second initial mode is an angular prediction mode, the angular prediction mode of the first initial mode and the second initial mode is offset according to a preset offset, so as to obtain the first intra prediction mode and the second intra prediction mode.

In some embodiments, the first determining unit 21 is further configured to determine the first initial mode as the first intra prediction mode and determine the second initial mode as the second intra prediction mode, if neither the first initial mode nor the second initial mode is the angular prediction mode.

In some embodiments, the predicting unit 23 is specifically configured to determine a first encoding cost corresponding to the intermediate prediction value according to the intermediate prediction value; determine second encoding costs when predicting the current block using intra prediction modes respectively in a candidate prediction set; and determine the target prediction value of the current block as a prediction value corresponding to a lowest encoding cost among the first encoding cost and the second encoding costs.

In some embodiments, the predicting unit 23 is further configured to set a second flag as true and signal the second flag into a bitstream when the first encoding cost is the lowest encoding cost among the first encoding cost and the second encoding costs. The predicting unit 23 is further configured to set the second flag as false and signal the second flag into the bitstream when the first encoding cost is not the lowest encoding cost among the first encoding cost and the second encoding costs, where the second flag indicates whether the target prediction value of the current block is determined according to at least one of the first intra prediction mode or the second intra prediction mode.

Optionally, the second flag is a TIMD enable flag.

In some embodiments, the second determining unit 22 is further configured to determine a type of a current frame where the current block is located, and determine according to the type of the current frame whether the weighted blending condition for the current block is determined according to the image content of the current sequence.

In some embodiments, the second determining unit 22 is further configured to determine the weighted blending condition for the current block according to the image content of the current sequence, when the type of the current frame is a target frame-type.

Optionally, the target frame-type includes at least one of an I frame, a P frame, or a B frame.

In some embodiments, the second determining unit 22 is further configured to determine a type of a current frame where the current block is located and a size of the current block, and determine according to the type of the current frame and the size of the current block whether the weighted blending condition for the current block is determined according to the image content of the current sequence.

In some embodiments, the second determining unit 22 is further configured to determine the weighted blending condition for the current block according to the image content of the current sequence, when the type of the current frame is a first frame-type and the size of the current block is greater than a first threshold. The second determining unit 22 is further configured to determine the weighted blending condition for the current block according to the image content of the current sequence, when the type of the current frame is a second frame-type and the size of the current block is greater than a second threshold.

Optionally, when the first frame-type is an I frame and the second frame-type is a B frame or a P frame, the second threshold is different from the first threshold.

In some embodiments, the second determining unit 22 is further configured to determine a quantization parameter corresponding to the current block; and determine according to the quantization parameter whether the weighted blending condition for the current block is determined according to the image content of the current sequence.

In some embodiments, the second determining unit 22 is further configured to determine the weighted blending condition for the current block according to the image content of the current sequence, when the quantization parameter is less than a third threshold.

Optionally, the first flag is reused with a third flag of the current sequence.

Optionally, the third flag is an IBC enable flag or a TMP enable flag of a sequence level.

In some embodiments, the predicting unit 23 is further configured to signal the first flag into the bitstream.

It may be understood that the apparatus embodiments and the method embodiments may correspond to each other, and similar descriptions may refer to the method embodiments. To avoid repetition, details are not repeated herein. Specifically, the apparatus 20 as illustrated in FIG. 13 can execute the intra prediction method in embodiments of the present disclosure, and the aforementioned and other operations and/or functions of each unit in the apparatus 20 are configured to implement related operations of the encoding method. For the sake of brevity, the corresponding processes are not repeated herein.

The apparatus and system of the embodiments of the present disclosure are described above from the perspective of functional units with reference to the accompanying drawings. It may be understood that the functional units may be implemented in the form of hardware, may also be implemented by instructions in the form of software, and may also be implemented by a combination of hardware and software units. Specifically, each step of the method embodiments in the present disclosure can be completed by an integrated logic circuit of the hardware in the processor and/or instructions in the form of software, and the steps of the method disclosed in embodiments of the disclosure can be directly executed by a hardware coding processor or a combination of hardware and software units in the decoding processor. Optionally, the software unit may be located in a mature storage medium in the field such as random access memory, flash memory, read-only memory, programmable read-only memory, electrically erasable programmable memory, and registers. The storage medium is located in the memory, and the processor reads the information from the memory, and completes the steps in the above method embodiments in combination with its hardware.

Figure 14:
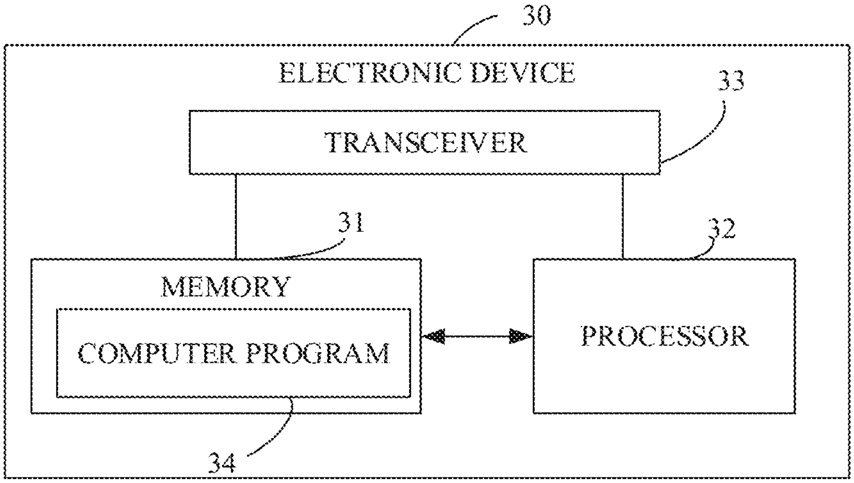
FIG. 14 is a schematic block diagram of an electronic device provided in embodiments of the present disclosure.

FIG. 14 is a schematic block diagram of an electronic device provided in embodiments of the present disclosure.

As illustrated in FIG. 14, the electronic device 30 may be the video encoder or video decoder described in embodiments of the present disclosure. The electronic device 30 may include a memory 31 and a processor 32. The memory 31 is configured to store a computer program 34 and transmit the program code 34 to the processor 32. In other words, the processor 32 can invoke and run the computer program 34 from the memory 31 to implement the method in embodiments of the present disclosure.

For example, the processor 32 can be configured to execute the steps in the above-mentioned method 200 according to the instructions in the computer program 34.

In some embodiments of the present disclosure, the processor 32 may include, but is not limited to: a general-purpose processor, digital signal processor (DSP), application specific integrated circuit (ASIC), field programmable gate array (FPGA), or other programmable logic devices, discrete gates or transistor logic devices, discrete hardware components, and so on. In some embodiments of the present disclosure, the memory 31 includes but is not limited to: volatile memory and/or non-volatile memory. The non-volatile memory can be a read-only memory (ROM), programmable read-only memory (PROM), erasable programmable read-only memory (EPROM), electrically programmable erase programmable read-only memory (EEPROM), or flash. The volatile memory may be random access memory (RAM), which acts as an external cache. By way of illustration and not limitation, many forms of RAM are available such as static RAM (SRAM), dynamic RAM (DRAM), synchronous DRAM (SDRAM), double data rate synchronous dynamic random access memory (DDR SDRAM), enhanced synchronous dynamic random access memory (enhanced SDRAM, ESDRAM), synchronous connection dynamic random access memory (synch link DRAM, SLDRAM) and direct memory bus random access memory (direct rambus RAM, DR RAM).

In some embodiments of the present disclosure, the computer program 34 can be divided into one or more units, and the one or more units are stored in the memory 31 and executed by the processor 32 to complete the methods in the present disclosure. The one or more units may be a series of computer program instruction segments capable of accomplishing specific functions, and the instruction segments are used to describe the execution process of the computer program 34 in the electronic device 30.

As illustrated in FIG. 14, the electronic device 30 may also include a transceiver 33, where the transceiver 33 may be connected to the processor 32 or the memory 31.

The processor 32 can control the transceiver 33 to communicate with other devices, specifically, to send information or data to other devices, or receive information or data sent by other devices. The transceiver 33 may include a transmitter and a receiver. The transceiver 33 may further include antennas, and the number of antennas may be one or more.

It may be understood that the various components in the electronic device 30 are connected through a bus system, where the bus system includes not only a data bus, but also a power bus, a control bus, and a status signal bus.

Figure 15:
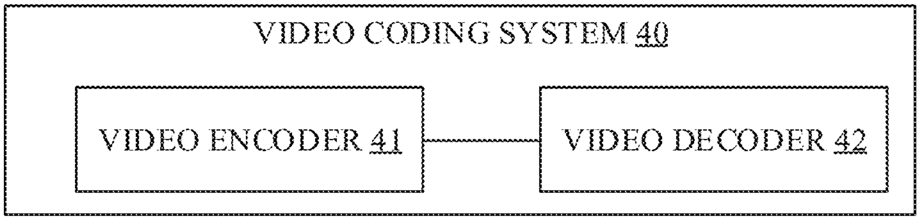
FIG. 15 is a schematic block diagram of a video coding system provided in embodiments of the present disclosure.

FIG. 15 is a schematic block diagram of a video coding system provided in embodiments of the present disclosure.

As illustrated in FIG. 15, the video coding system 40 may include a video encoder 41 and a video decoder 42, where the video encoder 41 is configured to execute the video encoding method involved in embodiments of the present disclosure, and the video decoder 42 is configured to execute the video decoding method involved in embodiments of the present disclosure.

The present disclosure further provides a computer storage medium, on which a computer program is stored, and when the computer program is executed by a computer, the computer can execute the methods of the above method embodiments. In other words, the embodiments of the present disclosure further provide a computer program product including instructions, and when the instructions are executed by a computer, the computer executes the methods of the foregoing method embodiments.

The present disclosure further provides a bitstream. The bitstream is generated according to the encoding method. Optionally, the bitstream may contain the first flag.

When implemented using software, the disclosure may be implemented in whole or in part in the form of a computer program product. The computer program product includes one or more computer instructions. When the computer program instructions are loaded and executed on the computer, the processes or functions according to the embodiments of the present disclosure will be generated in whole or in part. The computer can be a general-purpose computer, a special-purpose computer, a computer network, or other programmable devices. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a digital video disc (DVD)), or a semiconductor medium (such as a solid state disk (SSD)), etc.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific disclosure and design constraints of the technical solution. Those skilled in the art may use different methods to implement the described functions for each specific disclosure, but such implementation may not be regarded as exceeding the scope of the present disclosure.

In the several embodiments provided in this disclosure, it may be understood that the disclosed systems, apparatuses, and methods may be implemented in other ways. For example, the apparatus embodiments described above are only illustrative. For example, the division of the units is only a logical function division. In actual implementation, there may be other division methods. For example, multiple units or components can be combined or can be integrated into another system, or some features may be ignored, or not implemented. In another point, the mutual coupling or direct coupling or communication connection illustrated or discussed may be through some interfaces, and the indirect coupling or communication connection of devices or units may be in electrical, mechanical, or other forms.

A unit described as a separate component may or may not be physically separated, and a component displayed as a unit may or may not be a physical unit, that is, it may be located in one place, or may be distributed to multiple network units. Part or all of the units can be selected according to actual needs to achieve the purpose of the solution of this implementation. For example, each functional unit in each embodiment of the present disclosure may be integrated into one processing unit, each unit may exist separately physically, or two or more units may be integrated into one unit.

The above is only a specific implementation of the disclosure, but the scope of protection of the disclosure is not limited thereto. Those skilled in the art can easily think of changes or substitutions within the technical scope disclosed in the disclosure, which may be covered within the scope of protection of this disclosure. Therefore, the protection scope of the present disclosure may be based on the protection scope of the claims.

What is claimed is:

1. An intra prediction method, comprising:

decoding a bitstream to determine a first intra prediction mode and a second intra prediction mode for a current block;

determining a weighted blending condition for the current block, wherein the weighted blending condition is used to determine whether weighted prediction is performed on the current block based on the first intra prediction mode and the second intra prediction mode; and determining a target prediction value of the current block according to the weighted blending condition and at least one of the first intra prediction mode or the second intra prediction mode;

wherein determining the weighted blending condition comprises:

decoding the bitstream to obtain a first flag, wherein the first flag indicates whether a first technology is used; and when the first flag indicates that the first technology is used, determining a first blending condition as the weighted blending condition for the current block, wherein determining the first blending condition comprises:

determining a value of a first threshold as a first preset value, wherein the first threshold is used to determine the first blending condition; and determining the first blending condition according to a first cost corresponding to the first intra prediction mode, a second cost corresponding to the second intra prediction mode, and the determined first threshold.

2. The method of claim 1, wherein the first blending condition is that the second cost is less than a product of the first cost and the determined first threshold.

3. The method of claim 2, wherein determining the target prediction value of the current block according to the weighted blending condition and at least one of the first intra prediction mode or the second intra prediction mode comprises:

determining the target prediction value of the current block by using the first intra prediction mode and the second intra prediction mode, when the second cost is less than the product of the first cost and the determined first threshold.

4. The method of claim 2, wherein determining the target prediction value of the current block according to the weighted blending condition and at least one of the first intra prediction mode or the second intra prediction mode comprises:

determining the target prediction value of the current block by using the first intra prediction mode, when the second cost is greater than or equal to the product of the first cost and the determined first threshold.

5. The method of claim 1, further comprising:

determining the target prediction value of the current block according to the first intra prediction mode, when each of the first intra prediction mode and the second intra prediction mode is a non-angular prediction mode.

6. The method of claim 1, wherein determining the first intra prediction mode and the second intra prediction mode for the current block comprises:

decoding the bitstream to obtain a template-based intra mode derivation (TIMD) enable flag, wherein the TIMD enable flag indicates whether a TIMD technology is used for the current block;

determining an MPM list for the current block, when the TIMD enable flag indicates that the TIMD technology is used for the current block and at least one of a plurality of reference reconstruction samples of the current block exists; and determining the first intra prediction mode and the second intra prediction mode for the current block according to the MPM list.

7. The method of claim 1, wherein the first flag is reused with a third flag of the current sequence, and the third flag is an intra-block copy (IBC) enable flag or a template matching prediction (TMP) enable flag of a sequence level.

8. An intra prediction method, comprising:

determining a first intra prediction mode and a second intra prediction mode for a current block;

determining a weighted blending condition for the current block, wherein the weighted blending condition is used to determine whether weighted prediction is performed on the current block based on the first intra prediction mode and the second intra prediction mode;

determining an intermediate prediction value of the current block according to the weighted blending condition and at least one of the first intra prediction mode or the second intra prediction mode; and determining a target prediction value of the current block according to the intermediate prediction value;

wherein determining the weighted blending condition comprises:

determining a first blending condition as the weighted blending condition for the current block, when the first technology is used; and signalling a first flag into a bitstream, wherein the first flag indicates whether the first technology is used, wherein determining the first blending condition comprises:

determining a value of a first threshold as a first preset value, wherein the first threshold is used to determine the first blending condition; and determining the first blending condition according to a first cost corresponding to the first intra prediction mode, a second cost corresponding to the second intra prediction mode, and the determined first threshold.

9. The method of claim 8, wherein the first blending condition is that the second cost is less than a product of the first cost and the determined first threshold.

10. The method of claim 8, wherein determining the intermediate prediction value of the current block according to the weighted blending condition and at least one of the first intra prediction mode or the second intra prediction mode comprises:

determining the intermediate prediction value of the current block by using the first intra prediction mode and the second intra prediction mode, when the second cost is less than a product of the first cost and the determined first threshold; and determining the intermediate prediction value of the current block by using the first intra prediction mode, when the second cost is greater than or equal to the product of the first cost and the determined first threshold.

11. The method of claim 8, further comprising:

determining the intermediate prediction value of the current block according to the first intra prediction mode, when each of the first intra prediction mode and the second intra prediction mode is a non-angular prediction mode.

12. The method of claim 8, wherein determining the first intra prediction mode and the second intra prediction mode for the current block comprises:

obtaining a template-based intra mode derivation (TIMD) allowed flag, wherein the TIMD allowed flag indicates whether a TIMD technology is allowed for the current sequence;

obtaining an MPM list for the current block, when the TIMD allowed flag indicates that the TIMD technology is allowed for the current sequence and at least one of a plurality of reference reconstruction samples of the current block exists; and determining the first intra prediction mode and the second intra prediction mode for the current block according to the MPM list.

13. A video decoder, comprising:

a memory configured to store a computer program; and a processor configured to execute the computer program stored in the memory to:

decode a bitstream to determine a first intra prediction mode and a second intra prediction mode for a current block;

determine a weighted blending condition for the current block, wherein the weighted blending condition is used to determine whether weighted prediction is performed on the current block based on the first intra prediction mode and the second intra prediction mode; and determine a target prediction value of the current block according to the weighted blending condition and at least one of the first intra prediction mode or the second intra prediction mode;

wherein the processor configured to determine the weighted blending condition is configured to:

decode the bitstream to obtain a first flag, wherein the first flag indicates whether a first technology is used; and when the first flag indicates that the first technology is used, determine a first blending condition as the weighted blending condition for the current block, wherein the processor configured to determine the first blending condition is configured to:

determine a value of a first threshold as a first preset value, wherein the first threshold is used to determine the first blending condition; and determine the first blending condition according to a first cost corresponding to the first intra prediction mode, a second cost corresponding to the second intra prediction mode, and the determined first threshold.

* * * * *